United States Patent
Noguchi et al.

(10) Patent No.: US 7,032,019 B1
(45) Date of Patent: Apr. 18, 2006

(54) APPARATUSES FOR GENERATION AND COLLECTION OF INFORMATION BASED ON PRIORITY AND PREDETERMINED COLLECTING CONDITIONS

(75) Inventors: Mayumi Noguchi, Kawasaki (JP); Tetsuo Chimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 09/639,761

(22) Filed: Aug. 15, 2000

(30) Foreign Application Priority Data

Nov. 19, 1999 (JP) .................................. 11-330520

(51) Int. Cl.
*G06F 15/173* (2006.01)

(52) U.S. Cl. ...................... 709/224; 719/316; 707/102; 713/153

(58) Field of Classification Search ........ 709/224–226; 714/47; 707/102
See application file for complete search history.

(56) References Cited

U.S. PATENT DOCUMENTS

| | | | | |
|---|---|---|---|---|
| 3,818,458 A | * | 6/1974 | Deese | ........................ 714/47 |
| 4,855,997 A | * | 8/1989 | Wilson et al. | ............... 370/447 |
| 6,108,782 A | * | 8/2000 | Fletcher et al. | ............. 713/153 |
| 6,317,701 B1 | * | 11/2001 | Pyotsia et al. | .............. 702/188 |
| 6,421,676 B1 | * | 7/2002 | Krishnamurthy et al. | ... 707/102 |
| 6,470,388 B1 | * | 10/2002 | Niemi et al. | ................ 709/224 |

FOREIGN PATENT DOCUMENTS

| | | |
|---|---|---|
| JP | HEI 4-299429 A | 10/1992 |
| JP | HEI 4-299743 A | 10/1992 |
| JP | HEI 5-225161 A | 9/1993 |
| JP | HEI 6-189377 A | 7/1994 |
| JP | HEI 6-75001 U | 10/1994 |
| JP | HEI 10-40140 A | 2/1998 |

* cited by examiner

*Primary Examiner*—Wen-Tai Lin
(74) *Attorney, Agent, or Firm*—Staas & Halsey LLP

(57) ABSTRACT

This invention has a remote machine that collects local-machine logs via a network from a plurality of local machines, each of which has memory that stores local-machine logs generated due to its specific generation factor. This remote machine has a CPU that collects local-machine logs stored on the memory of a local machine only when the priority of the local machine is higher than the preset priority.

6 Claims, 13 Drawing Sheets

FIG.2

TA ; LOCAL-MACHINE LOG PRIORITY TABLE

| LOCAL-MACHINE LOG PRIORITY DATA P$_{LL}$ | LOG FACTOR | LOCAL-MACHINE LOG |
|---|---|---|
| 1 | HARDWARE ERROR | HARDWARE ERROR LOG |
| 2 | FIRMWARE ERROR/ SOFTWARE ERROR | FIRMWARE ERROR/ SOFTWARE ERROR LOG |
| 3 | LINE ERROR/ PROTOCOL ERROR | LINE ERROR/ PROTOCOL ERROR LOG |
| 4 | WARNING ERROR | WARNING ERROR LOG |
| 5 | INSIGNIFICANT ERROR | INSIGNIFICANT ERROR LOG |

FIG.3

$Z_1$ ; LOCAL-MACHINE LOG STORAGE AREA

IP ADDRESS $AD_{IP}=1$

| LOCAL-MACHINE LOG PRIORITY DATA $P_{LL}$ | LOCAL-MACHINE LOG | LOG FACTOR |
|---|---|---|
| 1 | $LOG_{LM1\_1}$ | HARDWARE ERROR |
| 3 | $LOG_{LM1\_2}$ | LINE ERROR/ PROTOCOL ERROR |
| 1 | $LOG_{LM1\_3}$ | HARDWARE ERROR |
| ⋮ | ⋮ | ⋮ |

$Z_2$ ; LOCAL-MACHINE LOG STORAGE AREA

IP ADDRESS $AD_{IP}=2$

| LOCAL-MACHINE LOG PRIORITY DATA $P_{LL}$ | LOCAL-MACHINE LOG | LOG FACTOR |
|---|---|---|
| 5 | $LOG_{LM2\_1}$ | INSIGNIFICANT ERROR |
| 2 | $LOG_{LM2\_2}$ | FIRMWARE ERROR/ SOFTWARE ERROR |
| 1 | $LOG_{LM2\_3}$ | HARDWARE ERROR |
| ⋮ | ⋮ | ⋮ |

⋮

$Z_n$ ; LOCAL-MACHINE LOG STORAGE AREA

IP ADDRESS $AD_{IP}=n$

| LOCAL-MACHINE LOG PRIORITY DATA $P_{LL}$ | LOCAL-MACHINE LOG | LOG FACTOR |
|---|---|---|
| 4 | $LOG_{LMn\_1}$ | WARNING ERROR |
| 3 | $LOG_{LMn\_2}$ | LINE ERROR/ PROTOCOL ERROR |
| 2 | $LOG_{LMn\_3}$ | FIRMWARE ERROR/ SOFTWARE ERROR |
| ⋮ | ⋮ | ⋮ |

FIG.4

TB1 ; INDIVIDUAL LOCAL-MACHINE LOG PRIORITY TABLE

| INDIVIDUAL LOCAL-MACHINE LOG PRIORITY DATA PS$_{LL}$ | LOG FACTOR | LOCAL-MACHINE LOG |
|---|---|---|
| 1 | HARDWARE ERROR | HARDWARE ERROR LOG |
| 2 | FIRMWARE ERROR/ SOFTWARE ERROR | FIRMWARE ERROR/ SOFTWARE ERROR LOG |
| 3 | LINE ERROR/ PROTOCOL ERROR | LINE ERROR/ PROTOCOL ERROR LOG |
| 4 | WARNING ERROR | WARNING ERROR LOG |
| 5 | INSIGNIFICANT ERROR | INSIGNIFICANT ERROR LOG |

TB2 ; INDIVIDUAL LOCAL-MACHINE LOG PRIORITY TABLE

| INDIVIDUAL LOCAL-MACHINE LOG PRIORITY DATA PS$_{LL}$ | LOG FACTOR | LOCAL-MACHINE LOG |
|---|---|---|
| 1 | LINE ERROR/ PROTOCOL ERROR | LINE ERROR/ PROTOCOL ERROR LOG |
| 2 | WARNING ERROR | WARNING ERROR LOG |
| 3 | HARDWARE ERROR | HARDWARE ERROR LOG |
| 4 | FIRMWARE ERROR/ SOFTWARE ERROR | FIRMWARE ERROR/ SOFTWARE ERROR LOG |
| 5 | INSIGNIFICANT ERROR | INSIGNIFICANT ERROR LOG |

⋮

TBn ; INDIVIDUAL LOCAL-MACHINE LOG PRIORITY TABLE

| INDIVIDUAL LOCAL-MACHINE LOG PRIORITY DATA PS$_{LL}$ | LOG FACTOR | LOCAL-MACHINE LOG |
|---|---|---|
| 1 | FIRMWARE ERROR/ SOFTWARE ERROR | FIRMWARE ERROR/ SOFTWARE ERROR LOG |
| 2 | HARDWARE ERROR | HARDWARE ERROR LOG |
| 3 | LINE ERROR/ PROTOCOL ERROR | LINE ERROR/ PROTOCOL ERROR LOG |
| 4 | WARNING ERROR | WARNING ERROR LOG |
| 5 | INSIGNIFICANT ERROR | INSIGNIFICANT ERROR LOG |

FIG.5    $Z_1$ ; LOCAL-MACHINE LOG STORAGE AREA

| IP ADDRESS AD$_{IP}$=1 | | |
|---|---|---|
| INDIVIDUAL LOCAL-MACHINE LOG PRIORITY DATA P$_{LL}$ | LOCAL-MACHINE LOG | LOG FACTOR |
| 1 | LOG$_{LM1\_1}$ | HARDWARE ERROR |
| 3 | LOG$_{LM1\_2}$ | LINE ERROR/PROTOCOL ERROR |
| | LOG$_{LM1\_3}$ | HARDWARE ERROR |
| ⋮ | ⋮ | ⋮ |

$Z_2$ ; LOCAL-MACHINE LOG STORAGE AREA

| IP ADDRESS AD$_{IP}$=2 | | |
|---|---|---|
| INDIVIDUAL LOCAL-MACHINE LOG PRIORITY DATA P$_{LL}$ | LOCAL-MACHINE LOG | LOG FACTOR |
| 5 | LOG$_{LM2\_1}$ | INSIGNIFICANT ERROR |
| 2 | LOG$_{LM2\_2}$ | WARNING ERROR |
| 1 | LOG$_{LM2\_3}$ | LINE ERROR/PROTOCOL ERROR |
| ⋮ | ⋮ | ⋮ |

⋮   $Z_n$ ; LOCAL-MACHINE LOG STORAGE AREA

| IP ADDRESS AD$_{IP}$=n | | |
|---|---|---|
| INDIVIDUAL LOCAL-MACHINE LOG PRIORITY DATA P$_{LL}$ | LOCAL-MACHINE LOG | LOG FACTOR |
| 4 | LOG$_{LMn\_1}$ | WARNING ERROR |
| 3 | LOG$_{LMn\_2}$ | LINE ERROR/PROTOCOL ERROR |
| 2 | LOG$_{LMn\_3}$ | HARDWARE ERROR |
| ⋮ | ⋮ | ⋮ |

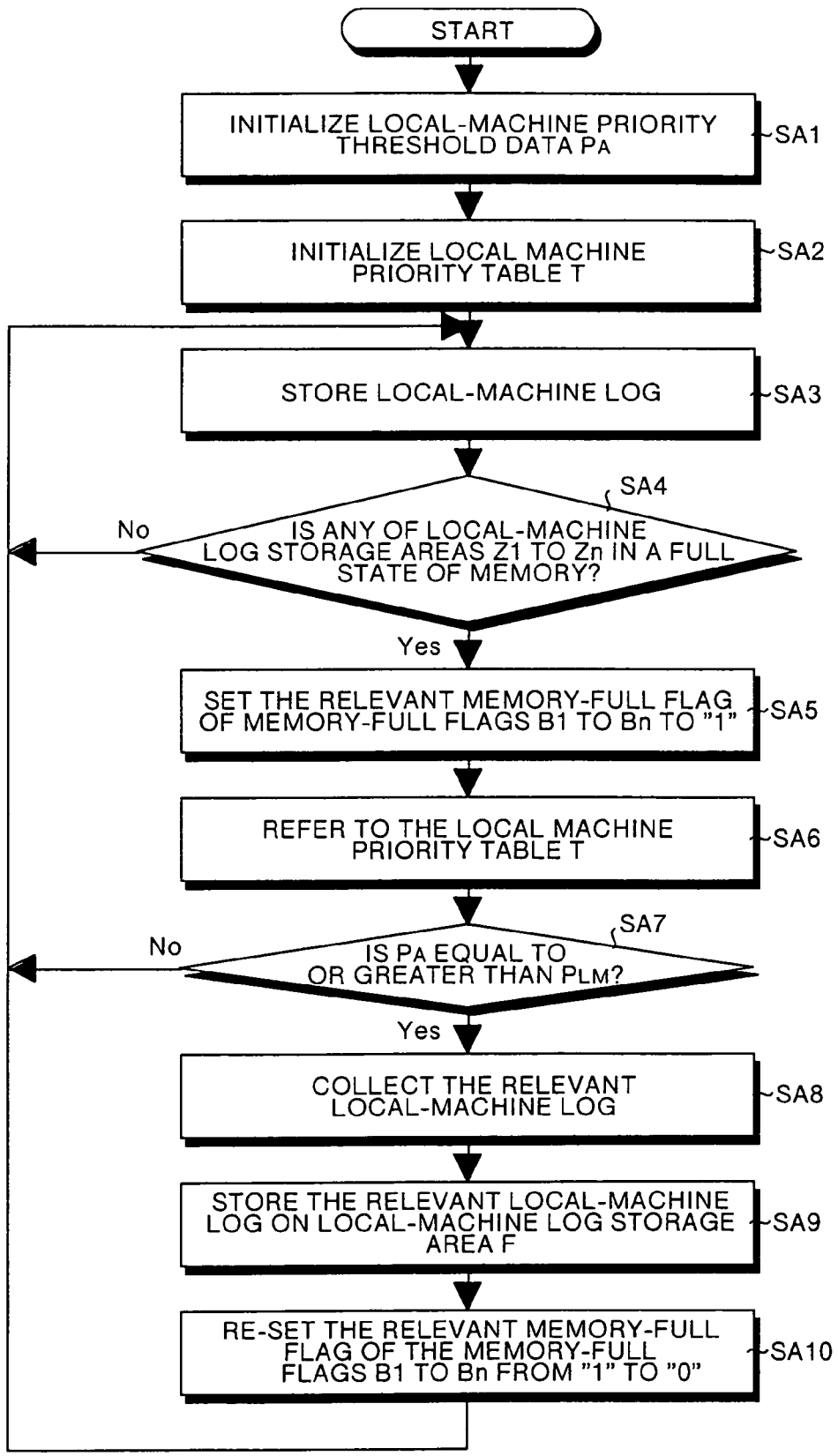

APPARATUSES FOR GENERATION AND COLLECTION OF INFORMATION BASED ON PRIORITY AND PREDETERMINED COLLECTING CONDITIONS

FIELD OF THE INVENTION

The present invention relates to an information collection apparatus and an information generation apparatus which collects information (e.g., logs) from a plurality of local machines (computer devices) or generates information. This invention also relates to a computer-readable recording medium where an information collecting program is recorded, and a computer-readable recording medium where an information generating program is recorded.

BACKGROUND OF THE INVENTION

Conventionally, there has been used a computer system in which a plurality of computer devices are connected through a network based on the concept of network & computing. In this type of system, one of the computer devices collects logs concerning occurrence of errors from the other computer devices, and the errors are handled based on the logs. In such a log-collection system, it is desirable that only the most possible important logs are collected from the viewpoints of utilization efficiency of resources.

The conventional type of information collection system comprises a plurality of local machines, each of which is placed in a user side, and a remote machine that collects logs concerning occurrence of errors from the plurality of local machines via a network. In this information collection system, a local machine generates a log caused by occurrence of an error, and stores the log on memory. When the memory becomes full, the local machine notifies the remote machine via the network that the memory is full.

Accordingly, the remote machine collects the logs from the relevant local machine via the network and stores the logs on memory. From then on, the remote machine performs collection and storage of logs each time the remote machine receives notification from respective local machines. Further, when generating a log after the memory becomes full, the local machine overwrites the memory with the relevant log. Accordingly, the old log stored on the memory is deleted.

As explained above, in the conventional type of information collection system, since the remote machine collects logs regardless of their priorities or importance, there may come up such circumstances that a large amount of logs with low priorities may be collected whereas logs with high priorities may hardly be collected.

Therefore, under such circumstances, there have been extremely serious problems that error handling based on the logs with high priorities may be delayed or error handling can not be performed if the worst happens. Further, in the conventional type of information collection system, there is an upper limit to memory capacity of a remote machine and a local machine. Therefore, there has been a problem that utilization efficiency of memory resources is degraded when a large amount of logs with low priorities is stored on such memory.

Further, in the conventional type of information collection system, an old log is deleted by being overwritten with a new log at the point of time the memory becomes full. Therefore, if the importance of the old log is extremely high (e.g., the log caused by occurrence of a critical error), the system can do nothing about the error handling, which has a profound effect on the system.

SUMMARY OF THE INVENTION

It is an object of this invention to provide an information collection apparatus and an information generation apparatus, which can collect a larger amount of information with high priority and also can enhance utilization efficiency of memory resources, and also provide a computer-readable recording medium where an information collecting program is recorded and a computer-readable recording medium where an information generating program is recorded.

According to one aspect of this invention, each of a plurality of information generation apparatuses generates information based on its specific generation factor and stores the information on a generation-side information storage unit. When the amount of information stored on the generation-side information storage unit reaches a predetermined amount, the relevant information generation apparatus then issues notification. Accordingly, an information collection unit collects the relevant information stored on the generation-side information storage unit of the relevant information generation apparatus only when the priority of the information generation apparatus is higher than the preset priority, namely only when the priority of the information generation apparatus is high. The collected information is then stored on a collection-side information storage unit. When the priority of the information generation apparatus is lower than the preset priority, the information is not collected from the relevant apparatus.

As explained above, respective priorities to be given to a plurality of information generation apparatuses are defined, and information is collected only from the information generation apparatus whose priority is high. Therefore, pieces of information generated in the information generation apparatuses with high priorities can be collected more as compared to those in the conventional case. Further, only the information generated in the information generation apparatus with a high priority is stored on the collection-side information storage unit. Thus, it is possible to enhance the utilization efficiency of the collection-side information storage unit that has an upper limit to its storage capacity.

According to another aspect of this invention, each of a plurality of information generation apparatuses generates information based on its specific generation factor and stores the information on a generation-side information storage unit. When the amount of information stored on the generation-side information storage unit reaches a predetermined amount, the relevant information generation apparatus then issues notification. Accordingly, an information collection unit collects pieces of information with priorities higher than the preset priority out of the information generated in the relevant information generation apparatus. The collected information is then stored on a collection-side information storage unit. When the priority of information is lower than the preset priority, the information is not collected.

Thus, only pieces of information with high priorities are collected. Therefore, of the information generated in the relevant information generation apparatus, pieces of information with high priorities can be collected more as compared to those in the conventional case. Further, only the information with a high priority is stored on the collection-side information storage unit. Thus, it is possible to enhance the utilization efficiency of the collection-side information storage unit that has an upper limit to its storage capacity.

Further, the priorities of respective information corresponding to a plurality of information generation apparatuses are set separately, and even if the same type of information exists, each of the priorities can be made different between the plurality of information generation apparatuses. Thus, information can flexibly be collected according to the state of the respective information generation apparatuses.

According to still another aspect of this invention, each of a plurality of information generation apparatuses generates information due to its specific generation factor and stores the information on a generation-side information storage unit. When a certain error has occurred, the relevant information generation apparatus issues notification. Accordingly, an information collection unit collects the information stored on the generation-side information storage unit of the information generation apparatus. The collected information is stored on a collection-side information storage unit.

Thus, upon occurrence of a certain error in an information generation apparatus, information is collected from the relevant information generation apparatus. Thus, any error that has occurred can speedily be handled.

Further, each of a plurality of information generation apparatuses generates information based on its specific generation factor and stores the information on a generation-side information storage unit. When a certain error has occurred, a substitution control unit allows an arbitrary information generation apparatus to act as a substitute to execute the operation of collecting information. Accordingly, the arbitrary information generation apparatus continues to collect information instead of the information collection apparatus.

Thus, even when a certain error has occurred, collecting information can be executed by an arbitrary information generation apparatus as a substitute. Thus, the collection of information can continuously be performed, which allows reliability to be enhanced.

Further, each of a plurality of information generation apparatuses generates information based on its specific generation factor and stores the information on a generation-side information storage unit. When a certain error has occurred, a substitution control unit allows any information generation apparatus with the lowest priority to act as a substitute to execute the operation of collecting information. Accordingly, the information generation apparatus with the lowest priority continues to collect information instead of the information collection unit.

Thus, when a certain error has occurred, any information generation apparatus with the lowest priority is allowed to act as a substitute to execute the operation of collecting information. Therefore, the collection of information can be continued, which allows degradation in respective performance of the other information generation apparatuses with high priorities to be avoided.

According to still another aspect of this invention, upon generation of information in an information generation unit based on its specific generation factor, an information storage unit stores the generated information only when the information has a priority higher than the preset priority. When the priority of the generated information is lower than the preset priority, the information is not stored.

Thus, only information with a high priority is stored. Therefore, it is possible to enhance the utilization efficiency of the information storage unit that has an upper limit to its storage capacity.

According to still another aspect of this invention, each of a plurality of information generation apparatuses generates information based on its specific generation factor and stores the information on a generation-side information storage unit. When the amount of information stored on the generation-side information storage unit reaches a predetermined amount, the relevant information generation apparatus then issues notification. Accordingly, in an information collecting step, the information stored on the generation-side information storage unit of the relevant information generation apparatus is collected only when the priority of the information generation apparatus is higher than the preset priority, namely only when the priority of the information generation apparatus is high. The collected information is then stored on a collection-side information storage unit in an information storing step. When the priority of the information generation apparatus is lower than the preset priority, the information is not collected from the relevant apparatus.

Thus, respective priorities to be given to a plurality of information generation apparatuses are defined, and information is collected only from the information generation apparatus whose priority is high. Therefore, information generated in the information generation apparatuses with high priorities can be collected more as compared to those in the conventional case. Further, only the information generated in the information generation apparatus with a high priority is stored on the collection-side information storage unit. Thus, it is possible to enhance the utilization efficiency of the collection-side information storage unit that has an upper limit to its storage capacity.

According to still another aspect of this invention, upon generation of information in an information generating step due to its specific generation factor, in an information storing step, the generated information is stored on an information storage unit only when the information has a priority higher than the preset priority. When the priority of the generated information is lower than the preset priority, the information is not stored.

Thus, only information with a high priority is stored. Therefore, it is possible to enhance the utilization efficiency of the information storage unit that has an upper limit to its storage capacity.

Other objects and features of this invention will become apparent from the following description with reference to the accompanying drawings.

BRIEF DESCRIPTION OF THE DRAWINGS

FIG. 2 shows a detail configuration of the local-machine log priority table TA shown in FIG. 1;

FIG. 3 shows a data structure of local-machine log storage areas $Z_1$ to $Z_n$ shown in FIG. 1;

FIG. 4 shows individual local-machine log priority tables $TB_1$ to $TB_n$ shown in FIG. 1;

FIG. 5 shows a data structure of local-machine log storage areas $Z_1$ to $Z_n$ in a fifth example of operation of the embodiment;

FIG. 6 is a flow chart showing a first example of operation of the embodiment;

DESCRIPTION OF THE PREFERRED EMBODIMENTS

A preferred embodiment of the information collection apparatus, the information generation apparatus, the computer-readable recording mediums according to the present invention will be explained in detail below with reference to the drawings.

Figure 1:
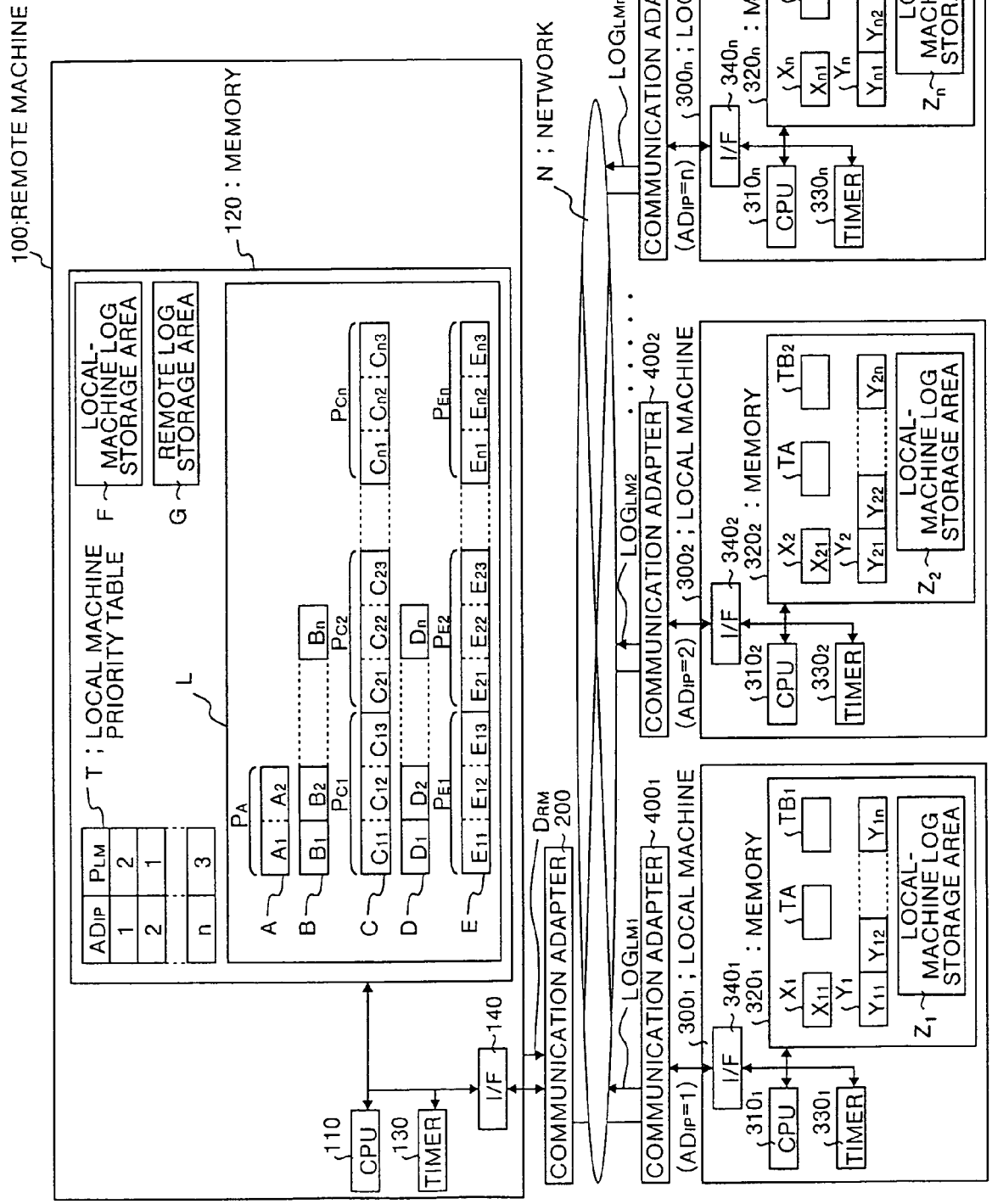
FIG. 1 is a block diagram showing a configuration of an embodiment of the present invention.

FIG. 1 is a block diagram showing a configuration of an embodiment of this invention. As shown in this figure, a remote machine 100 is connected to local machines $300_1$ to $300_n$ via a network N, a communication adapter 200, and communication adapters $400_1$ to $400_n$.

The remote machine 100 is a computer device installed in a remote center. This remote machine 100 remotely monitors the local machines $300_1$ to $300_n$ via the network N, the communication adapter 200, and the communication adapters $400_1$ to $400_n$, and also collects local-machine logs as error records occurring in the local machines $300_1$ to $300_n$. The factor by which a local-machine log (henceforth, log factor) is generated includes occurrence of a hardware error, a firmware error/software error, a line error/protocol error, and a warning error or an insignificant error.

The hardware error is an error when abnormal conditions occur in hardware of the local machines $300_1$ to $300_n$ or the communication adapters $400_1$ to $400_n$. The firmware error/software error is an error when abnormal conditions occur in the firmware, when abnormal conditions occur in the software, or when environment settings are not correctly performed. The line error/protocol error is an error when abnormal conditions occur in transmission over the network N, or when abnormal conditions occur in any communication protocol between the remote machine 100 and the local machines $300_1$ to $300_n$. The warning error is an error when abnormal conditions occur at such an alarm level that machine operation is not much affected by the abnormality. The insignificant error is an error when abnormal conditions occur at a low level so that machine operation is not affected by the abnormality.

The remote machine 100 comprises a CPU (Central Processing Unit) 100, a memory 120, a timer 130, and an I/F (Interface) 140. The CPU 110 provides controls for collection of local-machine logs, monitoring of errors concerning the remote machine 100, and read/write of data from/onto the memory 120. The details of the operation of this CPU 110 are explained later. The memory 120 stores the local-machine logs or the like under the control of the CPU 110.

The data structure of this memory 120 is explained later. The timer 130 outputs the result of recording the time to the CPU 110. The I/F 140 interfaces between the CPU 110 and the communication adapter 200. The communication adapter 200 is inserted between the I/F 140 and the network N, and performs communications with the communication adapters $400_1$ to $400_n$ according to a predetermined communication protocol.

Each of the local machines $300_1$ to $300_n$ is a computer device installed in the user side, and is remotely monitored by the remote machine 100 via the communication adapters $400_1$ to $400_n$, the network N, and the communication adapter 200. The local machines $300_1$ to $300_n$ write local-machine logs $LOG_{LM1}$ to $LOG_{LMn}$, as records of errors (a hardware error, a firmware error/software error, a line error/protocol error, a warning error or an insignificant error) occurring during operation, onto memories $320_1$ to $320_n$, respectively.

An IP address $AD_{IP}$ as an address on the network N is assigned to each of the local machines $300_1$ to $300_n$. For example, IP address $AD_{IP}$ "1" is assigned to the local machine $300_1$, and IP address $AD_{IP}$ "2" is assigned to the local machine $300_2$. Similarly, IP address $AD_{IP}$ "n" is assigned to the local machine $300_n$.

The local machine $300_1$ comprises a CPU $310_1$, a memory $320_1$, a timer $330_1$, and an I/F $340_1$. This CPU $310_1$ provides controls for monitoring of an error concerning the remote machine $300_1$, generation of a local-machine log $LOG_{LM1}$ corresponding to the error, and read/write of data from/onto the memory $320_1$. The details of the operation of this CPU $310_1$ are explained later.

The memory $320_1$ stores the local-machine log $LOG_{LM1}$ or the like under the control of the CPU $310_1$. The data structure of this memory $320_1$ is explained later. The I/F $340_1$ interfaces between the CPU $310_1$ and the communication adapter $400_1$. This communication adapter $400_1$ is inserted between the I/F $340_1$ and the network N, and performs communications with the communication adapter 200 via the network N according to the predetermined communication protocol.

In the same manner as the local machine $300_1$, the local machine $300_2$ comprises a CPU $310_2$, a memory $320_2$, a timer $330_2$, and an I/F $340_2$. This CPU $310_2$ provides controls for monitoring of an error concerning the remote machine $300_2$, generation of a local-machine log $LOG_{LM2}$ corresponding to the error, and read/write of data from/onto the memory $320_2$. The details of the operation of this CPU $310_2$ are explained later.

The memory $320_2$ stores the local-machine log $LOG_{LM2}$ under the control of the CPU $310_2$. The data structure of this memory $320_2$ is explained later. The I/F $340_2$ interfaces between the CPU $310_2$ and the communication adapter $400_2$. This communication adapter $400_2$ is inserted between the I/F $340_2$ and the network N, and performs communications with the communication adapter 200 via the network N according to the predetermined communication protocol.

In the same manner as the local machine $300_1$, the local machine $300_n$ comprises a CPU $310_n$, a memory $320_n$, a timer $330_n$, and an I/F $340_n$. This CPU $310_n$ provides controls for monitoring of an error concerning the remote machine $300_n$, generation of a local-machine log $LOG_{LMn}$ corresponding to the error, and read/write of data from/onto the memory $320_n$. The details of the operation of this CPU $310_n$ are explained later.

The memory $320_n$ stores the local-machine log $LOG_{LMn}$ under the control of the CPU $310_n$. The data structure of this memory $320_n$ is explained later. The I/F $340_n$ interfaces between the CPU $310_n$ and the communication adapter $400_n$. This communication adapter $400_n$ is inserted between the I/F $340_n$ and the network N, and performs communications with the communication adapter 200 via the network N according to the predetermined communication protocol.

The data structure of the memories $320_1$ to $320_n$ in the local machines $300_1$ to $300_n$ is explained below. The local-machine log priority table TA and the individual local-machine log priority table $TB_1$ are stored on the memory $320_1$ of the local machine $300_1$.

The CPU $310_1$ of the local machine $300_1$ generates local-machine logs (hardware error log to insignificant error log) corresponding to five types of log factors in total shown in FIG. 2. The first type of hardware error log is generated due to the hardware error by the CPU $310_1$. The second type of firmware error/software error log is generated due to the firmware error/software error.

The third type of line error/protocol error log is generated due to the line error/protocol error. The fourth type of warning error log is generated due to the warning error. Finally, the fifth type of insignificant error log is generated due to the insignificant error. Each of these local-machine logs consists of information such as a log factor, date and time of occurrence of an error, and place where the error occurs, namely the logs are historical data for occurrences of errors.

The local-machine log priority table TA defines respective priorities (degrees of importance) of the five types of local-machine logs (hardware error log to insignificant error log) with five levels from "1" to "5". Local-machine log priority data $P_{LL}$ indicates the priority, and any of the values from "1" to "5" is taken. Where the local-machine log priority data $P_{LL}$ of "1" is the highest priority, whereas the local-machine log priority data $P_{LL}$ of "5" is the lowest priority.

In other words, the hardware error log indicated by the local-machine log priority data $P_{LL}$ of "1" is one with the highest priority. The firmware error/software error log indicated by the local-machine log priority data $P_{LL}$ Of "2" is one with the next highest priority to the hardware error log. The line error/protocol error log indicated by the local-machine log priority data $P_{LL}$ Of "3" is one with the priority following the firmware error/software error log.

The warning error log indicated by the local-machine log priority data $P_{LL}$ of "4" is one with the priority following the line error/protocol error log. The insignificant error log indicated by the local-machine log priority data $P_{LL}$ Of "5" is one with the lowest priority. The individual local-machine log priority table $TB_1$ is explained in detail in the fifth example of operation, that is explained later.

Referring to FIG. 1, area $X_1$ is where a remote-machine substitute request flag $X_{11}$ is stored. This remote-machine substitute request flag $X_{11}$ indicates whether the local machine $300_1$ has been requested from the remote machine 100 to act as a substitute to execute the operation of collecting local-machine logs (henceforth, collection of local-machine logs), that should originally be executed by the remote machine 100, when any critical error has occurred in the remote machine 100. When the local machine $300_1$ has been requested to execute the collection of local-machine logs for the remote machine 100, the remote-machine substitute request flag $X_{11}$ is set to "1". On the other hand, when there has been no request to execute the collection of local-machine logs, the remote-machine substitute request flag $X_{11}$ is set to "0".

Area $Y_1$ is where remote-machine substitute declaration flags $Y_{11}$ to $Y_{in}$ are stored. The remote-machine substitute declaration flags $Y_{11}$ to $Y_{in}$ correspond to the local machines $300_1$ to $300_n$, and are used for declaration by each of the machines to act as a substitute to execute the collection of local-machine logs for the remote machine 100. For example, when the local machine $300_2$ executes the collection of local-machine logs for the remote machine 100, the remote-machine substitute declaration flag $Y_{12}$ corresponding to the local machine $300_2$ is set to "1", and all of the other remote-machine substitute declaration flags $Y_{11}$, $Y_{13}$ (not shown) to $Y_{in}$ is set to "0".

Local-machine logs $LOG_{LM1\_1}$ to $LOG_{LM1\_3}$, . . . related to the local machine $300_1$ are stored on the local-machine log storage area $Z_1$ as shown in FIG. 3 in order of their generation in correlation with the local-machine log priority data $P_{LL}$. The local-machine log priority data $P_{LL}$ and local-machine logs are correlated with each other based on the local-machine log priority table TA. Further, the data for the IP address $AD_{IP}$ (="1") assigned to the local machine $300_1$ is stored on the local-machine log storage area $Z_1$.

The local-machine log priority table TA and the individual local-machine log priority table $TB_2$ are stored on the memory $320_2$ of the local machine $300_2$. The CPU $310_2$ of the local machine $300_2$ generates local-machine logs (hardware error log to insignificant error log) corresponding to the five types of log factors in total shown in FIG. 2 in the same manner as that of the CPU $310_1$.

An area $X_2$ is where a remote-machine substitute request flag $X_{21}$ is stored. This remote-machine substitute request flag $X_{21}$ indicates whether the local machine $300_2$ has been requested from the remote machine 100 to act as a substitute to execute the collection of local-machine logs, that should originally be executed by the remote machine 100, when any critical error has occurred in the remote machine 100. When the local machine $300_2$ has been requested to execute the collection of local-machine logs for the remote machine 100, the remote-machine substitute request flag $X_{21}$ is set to "1". On the other hand, when there has been no request to execute the collection of local-machine logs, the remote-machine substitute request flag $X_{21}$ is set to "0".

Area $Y_2$ is where remote-machine substitute declaration flags $Y_{21}$ to $Y_{2n}$ are stored. The remote-machine substitute declaration flags $Y_{21}$ to $Y_{2n}$ correspond to the local machines $300_1$ to $300_n$, and are used for declaration by each of the machines to execute the collection of local-machine logs for the remote machine 100. For example, when the local machine $300_2$ executes the collection of local-machine logs for the remote machine 100, the remote-machine substitute declaration flag $Y_{22}$ corresponding to the local machine $300_2$ is set to "1", and all of the other remote-machine substitute declaration flags $Y_{21}$, $Y_{23}$ (not shown) to $Y_{2n}$ is set to "0".

Local-machine logs $LOG_{LM2\_1}$ to $LOG_{LM2\_3}$, . . . related to the local machine $300_2$ are stored on the local-machine log storage area $Z_2$ in correlation with the local-machine log priority data $P_{LL}$ in order of their generation as shown in FIG. 3. The local-machine log priority data $P_{LL}$ and local-machine logs are correlated with each other based on the local-machine log priority table TA. Further, the data for the IP address $AD_{IP}$ (="2") assigned to the local machine $300_2$ is stored on the local-machine log storage area $Z_2$. The individual local-machine log priority table $TB_2$ is explained later in the fifth example of operation.

Similarly, the local-machine log priority table TA and the individual local-machine log priority table $TB_n$ are stored on the memory $320_n$ of the local machine $300_n$. The CPU $310_n$ of the local machine $300_n$ generates local-machine logs (hardware error log to insignificant error log) corresponding to the five types of log factors in total shown in FIG. 2 in the same manner as that of the CPU $310_1$.

Area $X_n$ is where a remote-machine substitute request flag $X_{n1}$ is stored. This remote-machine substitute request flag $X_{n1}$ indicates whether the local machine $300_n$ has been requested from the remote machine 100 to act as a substitute to execute the collection of local-machine logs, that should originally be executed by the remote machine 100, when any critical error has occurred in the remote machine 100. When the local machine $300_n$ has been requested to execute the collection of local-machine logs for the remote machine 100, the remote-machine substitute request flag $X_{n1}$ is set to "1". On the other hand, when there has been no request to execute the collection of local-machine logs, the remote-machine substitute request flag $X_{n1}$ is set to "0".

Area $Y_n$ is where remote-machine substitute declaration flags $Y_{n1}$ to $Y_{nn}$ are stored. The remote-machine substitute declaration flags $Y_{n1}$ to $Y_{nn}$ correspond to the local machines $300_1$ to $300_n$, and are used for declaration by each of the machines to execute the collection of local-machine logs for the remote machine 100. For example, when the local machine $300_n$ executes the collection of local-machine logs for the remote machine 100, the remote-machine substitute declaration flag $Y_{nn}$ corresponding to the local machine $300_n$ is set to "1", and all of the other remote-machine substitute declaration flags $Y_{n1}$ to $Y_{nn-1}$ (not shown) is set to "0".

Local-machine logs $LOG_{LMn\_1}$ to $LOG_{LMn\_3}, \ldots$ related to the local machine $300_n$ are stored on the local-machine log storage area $Z_n$ in correlation with the local-machine log priority data $P_{LL}$ in order of their generation as shown in FIG. 3. The local-machine log priority data $P_{LL}$ and the local-machine logs are correlated with each other based on the local-machine log priority table TA. Further, the data for the IP address $AD_{IP}$ (="n") assigned to the local machine $300_n$ is stored on the local-machine log storage area $Z_n$. The individual local-machine log priority table $TB_n$ is explained later in the fifth example of operation.

The data structure of the memory 120 in the remote machine 100 is explained below. A local machine priority table T is stored on this memory 120. This local machine priority table T defines the respective priorities (degrees of importance) of the local machines $300_1$ to $300_n$ with three levels from "1" to "3".

For example, the IP address $AD_{IP}$ ("11" to "n") assigned to the respective local machines $300_1$ to $300_n$ is correlated with local machine priority data $P_{LM}$. This local machine priority data $P_{LM}$ represents the priority, and any of values of "1" to "3" is taken. Where the local machine priority data $P_{LM}$ of "1" is the highest priority, whereas the local machine priority data $P_{LM}$ of "3" is the lowest priority.

A local machine with the local machine priority data $P_{LM}$ of "1" is a machine where troubles often occur or a machine of an important user that requires urgent handling at the time of occurrence of trouble. On the other hand, a local machine with the local machine priority data $P_{LM}$ of "3" is a machine that runs under normal conditions or a machine of a general user that does not require urgent handling at the time of occurrence of trouble. A local machine with the local machine priority data $P_{LM}$ of "2" ranks as an intermediate one between the local machine with the local machine priority data $P_{LM}$ of "1" and the local machine with the local machine priority data $P_{LM}$ of "3".

Local-machine logs collected from at least one of the local machines $300_1$ to $300_n$ are stored on a local-machine log storage area F. Remote-machine logs concerning the remote machine 100 are stored on a remote log storage area G. Various types of data used when local-machine logs are collected are stored on a data storage area L for collection of local-machine logs.

In this data storage area L for collection of local-machine logs, 2-bit (bit $A_1$, bit $A_2$) threshold data $P_A$ for local machine priorities is stored on a storage area A. This local-machine priority threshold data $P_A$ is a threshold value used for collecting local-machine logs from the local machines $300_1$ to $300_n$. In this case, a local-machine log is collected from a local machine with a local machine priority higher than the priority corresponding to the local-machine priority threshold data $P_A$.

Memory-full flags $B_1$ to $B_n$ are stored on a storage area B. These memory-full flags $B_1$ to $B_n$ correspond to the memories $320_1$ to $320_n$, and indicate whether local-machine logs reaching full storage capacity are stored on the local-machine log storage areas $Z_1$ to $Z_n$. In other words, each of the memory-full flags $B_1$ to $B_n$ indicates whether each of the memories $320_1$ to $320_n$ is full.

For example, when the maximum possible capacity of local-machine logs is stored on the local-machine log storage area $Z_2$ of the memory $320_2$ and the area $Z_2$ has entered a full state of memory, the memory-full flag $B_2$ is set to "1". At this point of time, assuming that the other memories $320_1$, $320_3$ (not shown) to $320_n$ are not in the full state of memory, the corresponding memory-full flags $B_1$, $B_3$ (not shown) to $B_n$ are set to "0".

3-bit (bits $C_{11}$ to $C_{13}$, bits $C_{21}$ to $C_{23}$, ..., bits $C_{n1}$ to $C_{n3}$) threshold data $P_{C1}$ to $P_{Cn}$ for local-machine log priorities is stored on a storage area C. The respective local-machine log priority threshold data $P_{C1}$ to $P_{Cn}$ correspond to the local machines $300_1$ to $300_n$, and any value of local-machine log priorities "1" to "5" (decimal) is taken in each of the data.

The local-machine log priority threshold data $P_{C1}$ is a threshold value used for collecting local-machine logs from the local machine $300_1$. In this case, the local-machine logs each with a local-machine log priority higher than the priority corresponding to the local-machine log priority threshold data $P_{C1}$ are collected from the local machine $300_1$.

The local-machine log priority threshold data $P_{C2}$ is a threshold value used for collecting local-machine logs from the local machine $300_2$. In this case, the local-machine logs each with a local-machine log priority higher than the priority corresponding to the local-machine log priority threshold data $P_{C2}$ are collected from the local machine $300_2$.

Similarly, the local-machine log priority threshold data $P_{Cn}$ is a threshold value used for collecting local-machine logs from the local machine $300_n$. In this case, the local-machine logs each with a local-machine log priority higher than the priority corresponding to the local-machine log priority threshold data $P_{Cn}$ are collected from the local machine $300_n$.

Critical error flags $D_1$ to $D_n$ are stored on a storage area D. These critical error flags $D_1$ to $D_n$ correspond to the local machines $300_1$ to $300_n$, and indicate whether a critical error has occurred in the local machines $300_1$ to $300_n$. The critical error we mention here indicates an error which causes the corresponding local machine to disable its proper performance or which is a probable cause of the failure, and includes a hardware error (see FIG. 2).

For example, when a critical error has occurred in the local machine $300_2$, the critical error flag $D_2$ corresponding to the local machine $300_2$ is set to "1". At this point of time, assuming that no critical error has occurred in the other local machines $300_1$, and $300_3$ to $300_n$, the corresponding critical error flags $D_1$, $D_3$ (not shown) to $D_n$ are set to "0".

3-bit (bits $E_{11}$ to $E_{13}$, bits $E_{21}$ to $E_{23}$, ..., bits $E_{n1}$ to $E_{n3}$) individual local-machine log priority threshold data $P_{E1}$ to $P_{En}$ is stored on a storage area E. The details of the individual local-machine log priority threshold data $P_{E1}$ to $P_{En}$ are explained later in the fifth example of operation.

First Example of Operation:

A first example of operation of the embodiment is explained below with reference to the flow chart shown in FIG. 6. In this example, the remote machine 100 collects local-machine logs from a local machine, whose memory is full, of the local machines $300_1$ to $300_n$, and whose machine priority is higher than the previously initialized priority.

At step SA1 as shown in FIG. 6, the CPU 110 of the remote machine 100 initializes the local-machine priority threshold data $P_A$. In this case, the CPU 110 initializes "2" (decimal) as the local-machine priority threshold data $P_A$. Accordingly, "01" (binary) corresponding to the "2" (decimal) are set in the bits $A_1$ and $A_2$ on the storage area A of the memory 120. Further, the CPU 110 checks the memory-full flags $B_1$ to $B_n$ at predetermined time intervals based on the result of recording the time obtained from the timer 130.

At step SA2, the CPU 110 initializes the local machine priority table T. In this case, the CPU 110 sets "2" in the local machine priority data $P_{LM}$ corresponding to the IP address $AD_{IP}$ (="1": local machine $300_1$), and also sets "1" in the local machine priority data $P_{LM}$ corresponding to the IP address $AD_{IP}$ (="2": local machine $300_2$). The CPU 110 sets "3" in the local machine priority data $P_{LM}$ corresponding to the IP address $AD_{IP}$ (="n": local machine $300_n$) in the same manner as explained above.

At step SA3, each of the CPUs $310_1$ to $310_n$ of the local machines $300_1$ to $300_n$ stores a local-machine log (e.g., hard error log, firmware error/software error log), each time an error (e.g., hardware error, firmware error/software error) occurs, on the respective local-machine log storage areas $Z_1$ to $Z_n$ in correlation with the local-machine log priority data $P_{LL}$ (see FIG. 3). The local-machine log priority table TA (see FIG. 2) is referred to for this correlation.

For example, the CPU $310_1$ of the local machine $300_1$ correlates, as shown in FIG. 3, the local-machine log $LOG_{LM1\_1}$ with the local-machine log priority data $P_{LL}$ (="1"), and stores the data on the local-machine log storage area $Z_1$ of the memory $320_1$. Similarly, the CPU $310_2$ of the local machine $300_2$ correlates, as shown in FIG. 3, the local-machine log $LOG_{LM2\_1}$ with the local-machine log priority data $P_{LL}$ (="5"), and stores the data on the local-machine log storage area $Z_2$ of the memory $320_2$.

The CPU $310_n$ of the local machine $300_n$ correlates the local-machine log $LOG_{LMn\_1}$ with the local-machine log priority data $P_{LL}$ (="4"), and stores the data on the local-machine log storage area $Z_n$ of the memory $320_n$ in the same manner as explained above, as shown in FIG. 3.

At step SA4, each of the CPUs $310_1$ to $310_n$ determines whether any of the local-machine log storage areas $Z_1$ to $Z_n$ of the memories $320_1$ to $320_n$ is in a full state of memory. In this case, each of the CPUs $310_1$ to $310_n$ determines that the result of determination is "No". Therefore, the operational sequence from step SA3 is repeated. Accordingly, the local-machine logs are stored on each of the local-machine log storage areas $Z_1$ to $Z_n$ shown in FIG. 3 in order of their generation.

When the local-machine log storage area $Z_2$ has entered a full state of memory due to frequent occurrences of errors in the local machine $300_2$, the CPU $310_2$ determines that the result of determination at step SA4 is "Yes".

At step SA5, the CPU $310_2$ accesses the storage area B of the memory 120 via the I/F $340_2$, the communication adapter $400_2$, the network N, the communication adapter 200, and the I/F 140. The CPU $310_2$ then sets the memory-full flag $B_2$ that corresponds to the local machine $300_2$, of the memory-full flags $B_1$ to $B_n$ of the storage area B, to "1".

Accordingly, at step SA6, the CPU 110 of the remote machine 100 recognizes that the local-machine log storage area $Z_2$ of the local machine $300_2$ is in the full state of memory, and refers to the local machine priority table T. The CPU 110 recognizes the local machine priority data $P_{LM}$ (="1") for the local machine $300_2$ from the local machine priority table T.

At step SA7, the CPU 110 determines whether the local machine priority data $P_{LM}$ (="1") for the local machine $300_2$ is lower than the local-machine priority threshold data $P_A$ (in this case, "2") initialized at step SA1. In other words, the CPU 110 determines whether the priority of the local machine $300_2$ is higher than the priority set at step SA1.

In this case, the CPU 110 determines that the result of determination at step SA7 is "Yes". At step SA8, the CPU 110 accesses the memory $320_2$ via the I/F 140, the communication adapter 200, the network N, the communication adapter $400_2$, and the I/F $340_2$. The CPU 110 then collects the local-machine logs $LOG_{LM2\_1}$ to $LOG_{LM2\_3}$ stored on the local-machine log storage area $Z_2$ of the memory $320_2$ as the local-machine log $LOG_{LM2}$.

At step SA9, the CPU 110 stores the local-machine log $LOG_{LM2}$ on the local-machine log storage area F of the memory 120. At step SA10, the CPU 110 sets the memory-full flag $B_2$ corresponding to the local machine $300_2$, from which the local-machine log $LOG_{LM2}$ has been collected, from "1" to "0".

As step SA3 and from then on, the operation is repeated. When a new local-machine log is generated in the local machine $300_2$ after the local-machine logs are collected, the CPU $310_2$ overwrites the local-machine log storage area $Z_2$ with the new local-machine log. By this overwriting, the old local-machine log is deleted, but this old local-machine log has already been stored on the local-machine log storage area F of the remote machine 100.

When the local-machine log storage area $Z_n$ has entered a full state of memory due to frequent occurrences of errors in the local machine $300_n$, the CPU $310_n$ determines that the result of determination at step SA4 is "Yes".

At step SA5, the CPU $310_n$ accesses the storage area B of the memory 120 via the I/F $340_n$, the communication adapter $400_n$, the network N, the communication adapter 200, and the I/F 140 in the same manner as the operation of the CPU $310_2$. The CPU $310_n$ then sets the memory-full flag $B_n$ that corresponds to the local machine $300_n$, of the memory-full flags $B_1$ to $B_n$ of the storage area B, to "1".

Accordingly, at step SA6, the CPU 110 of the remote machine 100 recognizes that the local-machine log storage area $Z_n$ of the local machine $300_n$ is in the full state of memory, and refers to the local machine priority table T. The CPU 110 recognizes the local machine priority data $P_{LM}$ (="3") for the local machine $300_n$ from the local machine priority table T.

At step SA7, the CPU 110 determines whether the local machine priority data $P_{LM}$ (="3") for the local machine $300_n$ is lower than the local-machine priority threshold data $P_A$ (in this case, "2") initialized at step SA1.

In this case, the CPU 110 determines that the result of determination at step SA7 is "No". Therefore, the operational sequence from step SA3 is repeated. In other words, since the priority of the local machine $300_n$ is lower than the priority set at step SA1, the local-machine log $LOG_{LMn}$ is not collected from the local machine $300_n$.

As explained above, according to the first example of operation of the embodiment, priorities to be given to n units of local machines $300_1$ to $300_n$ are defined, and a local-machine log is collected only from a local machine with a high priority. Therefore, local-machine logs generated in local machines each with a high priority can be collected more as compared to those in the conventional case. Further, only local-machine logs generated in local machines each with a high priority are stored on the local-machine log storage area F of the memory 120. Therefore, it is possible to enhance the utilization efficiency of the memory 120 that has an upper limit to its storage capacity.

Second Example of Operation:

A second example of operation of the embodiment is explained below with reference to the flow chart shown in FIG. 7. In this example, the remote machine 100 collects local-machine logs, each of which has a local-machine log priority higher than the previously initialized priority. In other words, these local-machine logs are collected from the local-machine logs of a local machine, whose memory is full, of the local machines $300_1$ to $300_n$.

Figure 7:
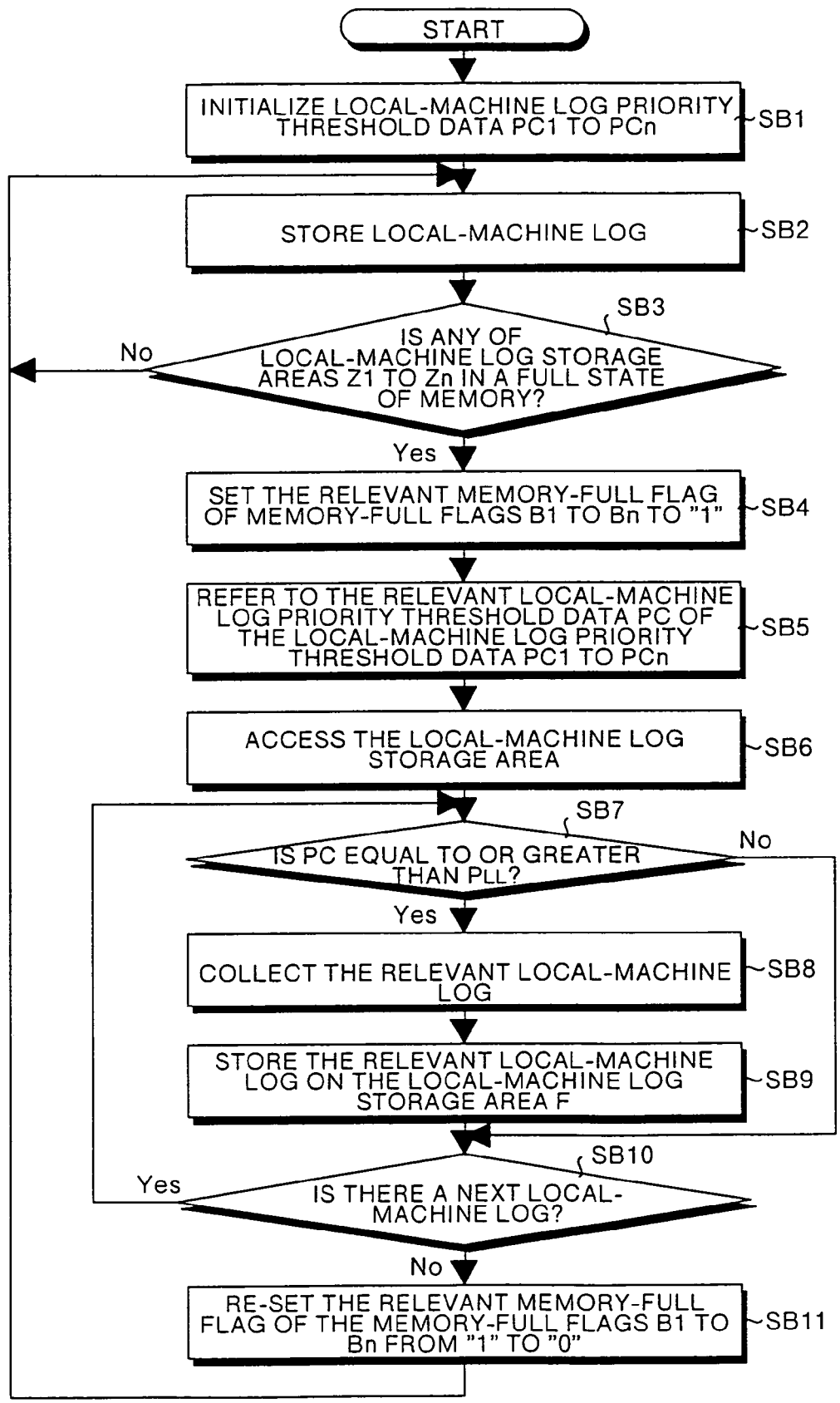
FIG. 7 is a flow chart showing a second example of operation of the embodiment.

At step SB1 as shown in FIG. 7, the CPU 110 of the remote machine 100 initializes each of the local-machine log priority threshold data $P_{C1}$ to $P_{Cn}$. In this case, the CPU 110 initializes "2" (decimal) out of "1" to "5" as the local-machine log priority threshold data $P_{C1}$. Accordingly, "001" (binary) corresponding to the "2" (decimal) are set in the bits $C_{11}$ to $C_{13}$ on the storage area C of the memory 120.

Similarly, the CPU 110 initializes "3" (decimal) out of "1" to "5" as the local-machine log priority threshold data $P_{C2}$ Accordingly, "010" (binary) corresponding to the "3" (decimal) are set in the bits $C_{21}$ to $C_{23}$ on the storage area C of the memory 120.

The CPU 110 initializes "5" (decimal) out of "1" to "5" as the local-machine log priority threshold data $P_{Cn}$ in the same manner as explained above. Accordingly, "100" (binary) corresponding to the "5" (decimal) are set in the bits $C_{n1}$ to $C_{n3}$ on the storage area C of the memory 120. Further, the CPU 110 checks the memory-full flags $B_1$ to $B_n$ at predetermined time intervals based on the result of recording the time obtained from the timer 130.

At step SB2, each of the CPUs $310_1$ to $310_n$ of the local machines $300_1$ to $300_n$ stores a local-machine log, each time an error occurs, on the respective local-machine log storage areas $Z_1$ to $Z_n$ in correlation with the local-machine log priority data $P_{LL}$ in the same manner as the step SA3 (see FIG. 6).

At step SB3, each of the CPUs $310_1$ to $310_n$ determines whether any of the local-machine log storage areas $Z_1$ to $Z_n$ of the memories $320_1$ to $320_n$ is in a full state of memory. In this case, each of the CPUs $310_1$ to $310_n$ determines that the result of determination is "No". Therefore, the operational sequence from step SB2 is repeated. Accordingly, the local-machine logs are stored on each of the local-machine log storage areas $Z_1$ to $Z_n$ shown in FIG. 3 in order of their generation.

When the local-machine log storage area $Z_2$ has entered a full state of memory due to frequent occurrences of errors in the local machine $300_2$, the CPU $310_2$ determines that the result of determination at step SB3 is "Yes".

At step SB4, the CPU $310_2$ accesses the storage area B of the memory 120 via the I/F $340_2$, the communication adapter $400_2$, the network N, the communication adapter 200, and the I/F 140 in the same manner as the step SA5 (see FIG. 6). The CPU $310_2$ then sets the memory-full flag $B_2$ to "1".

Accordingly, at step SB5, the CPU 110 of the remote machine 100 recognizes that the local-machine log storage area $Z_2$ of the local machine $300_2$ is in the full state of memory. The CPU 110 then refers to the local-machine log priority threshold data $P_C$ (in this case, $P_{C2}$="3") corresponding to the local machine $300_2$, of the local-machine log priority threshold data $P_{C1}$ to $P_{Cn}$.

At step SB6, the CPU 110 accesses the local-machine log storage area $Z_2$ (see FIG. 3) of the memory $320_2$ via the I/F 140, the communication adapter 200, the network N, the communication adapter $400_2$, and the I/F $340_2$.

At step SB7, the CPU 110 determines whether the local-machine log priority data $P_{LL}$ (="5") in a first record shown in FIG. 3 is lower than the local-machine log priority threshold data $P_{C2}$ (in this case, "3") referred to at step SB5. In other words, the CPU 110 determines whether the priority of the local-machine logs $LOG_{LM2\_1}$ is higher than the priority set at step SB1.

In this case, the CPU 110 determines that the result of determination at step SB7 is "No". At step SB10, the CPU 110 determines whether there is a next local-machine log on the local-machine log storage area $Z_2$. In this case, the CPU 110 determines that the result of determination is "Yes".

At step SB7, the CPU 110 determines whether the local-machine log priority data $P_{LL}$ (="2") in a second record shown in FIG. 3 is lower than the local-machine log priority threshold data $P_{C2}$ (in this case, "3") referred to at step SB5. In this case, the CPU 110 determines that the result of determination at step SB7 is "Yes". At step SB8, the CPU 110 collects the secondly-recorded local-machine log $LOG_{LM2\_2}$ of the local-machine log storage area $Z_2$ via the I/F $340_2$, the communication adapter $400_2$, the network N, the communication adapter 200, and the I/F 140.

At step SB9, the CPU 110 stores the local-machine log $LOG_{LM2\_2}$ on the local-machine log storage area F of the memory 120. At step SB10, the CPU 110 determines whether there is a next local-machine log on the local-machine log storage area $Z_2$. In this case, the CPU 110 determines that the result of determination is "Yes", and returns to step SB7.

The operation is repeated from then on. Local-machine logs each of which has a local-machine log priority higher than the priority initialized at step SB1, of the plurality of local-machine logs stored on the local-machine log storage area $Z_2$, are collected by the CPU 110 of the remote machine 100.

When the processing for the last record of the local-machine log storage area $Z_2$ is finished, the CPU 110 determines that the result of determination at step SB10 is "No". At step SB11, the CPU 110 sets the memory-full flag $B_2$ corresponding to the local machine $300_2$ from "1" to "0". The operation is repeated at step SB2 and from then on.

As explained above, according to the second example of operation of the embodiment, only local-machine logs with high priorities are collected. Therefore, local-machine logs with high priorities, of the local-machine logs generated in the relevant local machine, can be collected more as compared to those in the conventional case.

Third Example of Operation:

A third example of operation of the embodiment is explained below with reference to the flow chart shown in FIG. 8. In this example, each of the local machines $300_1$ to $300_n$ stores a local-machine log on the corresponding local-machine log storage area only when the priority of the local-machine log, that corresponds to a log factor at the time of occurrence of the log factor, is higher than the previously initialized priority.

Figure 8:
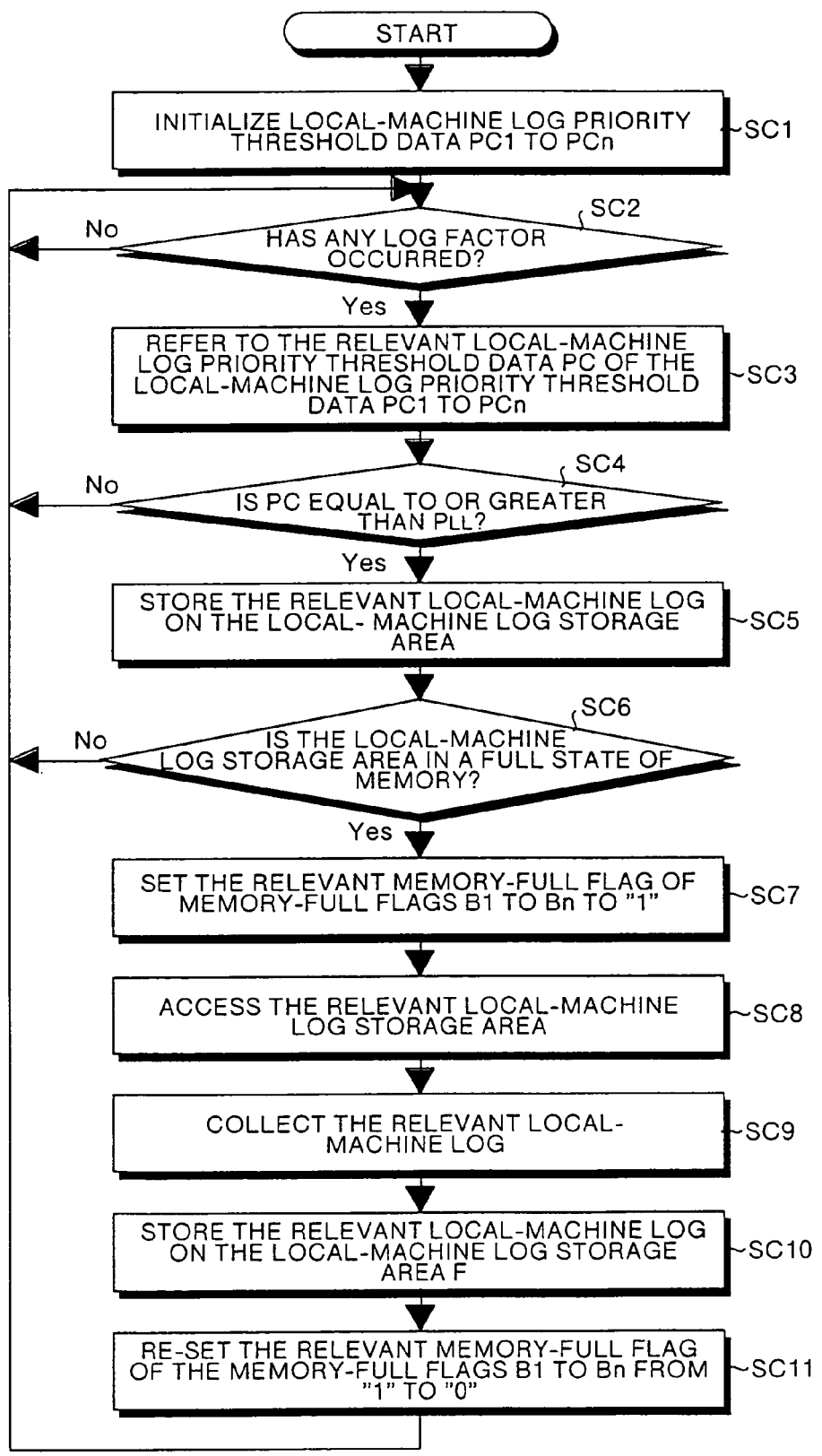
FIG. 8 is a flow chart showing a third example of operation of the embodiment.

At step SC1 as shown in FIG. 8, the CPU 110 of the remote machine 100 initializes each of the local-machine log priority threshold data $P_{C1}$ to $P_{Cn}$ in the same manner as the step SB1 (see FIG. 7). In this case, the CPU 110 initializes "2" (decimal) out of "1" to "5" as the local-machine log priority threshold data $P_{C1}$, and also "3" (decimal) as the local-machine log priority threshold data $P_{C2}$.

The CPU 110 then initializes "5" (decimal) in respective bits as the local-machine log priority threshold data $P_{Cn}$ in the same manner as explained above. Further, the CPU 110 checks the memory-full flags $B_1$ to $B_n$ at predetermined time intervals based on the result of recording the time obtained from the timer 130.

At step SC2, each of the CPUs $310_1$ to $310_n$ of the local machines $300_1$ to $300_n$ determines whether a log factor (e.g., hardware error, firmware error/software error) has occurred, and repeats the processing of determination when the result of determination is "No". For example, when an insignificant error has occurred as a log factor in the local machine $300_2$, =the CPU $310_2$ determines that the result of determination at step SC2 is "Yes".

At step SC3, the CPU $310_2$ accesses the memory 120 via the I/F $340_2$, the communication adapter $400_2$, the network N, the communication adapter 200, and the I/F 140. The CPU $310_2$ then refers to the local-machine log priority threshold data $P_C$ (in this case, $P_{C2}$="3") corresponding to the local machine $300_2$, of the local-machine log priority threshold data $P_{C1}$ to $P_{Cn}$.

At step SC4, the CPU $310_2$ checks the local-machine log priority data $P_{LL}$ (="5") of the local-machine log corresponding to the log factor (in this case, an insignificant error) occurring at step SC2 by referring to the local-machine log priority table TA. The CPU $310_2$ then determines whether the local-machine log priority data $P_{LL}$ (="5") is lower than the local-machine log priority threshold data $P_{C2}$ (in this case, "3"). In other words, the CPU $310_2$ determines whether the priority of the relevant local-machine log is higher than the priority set at step SC1.

In this case, the CPU $310_2$ determines that the result of determination at step SC4 is "No". Therefore, the operational sequence from step SC2 is repeated. When a hardware error as a log factor has occurred in the local machine $300_2$, the CPU $310_2$ determines that the result of determination at step SC2 is "Yes".

At step SC3, the CPU $310_2$ refers to the local-machine log priority threshold data $P_C$ (in this case, $P_{C2}$="3") corresponding to the local machine $300_2$ in the same manner as the operation explained above. At step SC4, the CPU $310_2$ checks the local-machine log priority data $P_{LL}$ (="1") of a local machine corresponding to the log factor (in this case, hardware error) occurring at step SC2 by referring to the local-machine log priority table TA.

The CPU $310_2$ determines whether the local-machine log priority data $P_{LL}$ (="1") is lower than the local-machine log priority threshold data $P_{C2}$ (in this case, "3") referred to at step SB3. In this case, the CPU $310_2$ determines that the result of determination at step SC4 is "Yes".

At step SC5, the CPU $310_2$ stores the local-machine log corresponding to the hardware error on the local-machine log storage area $Z_2$. At step SC6, the CPU $310_2$ determines whether the local-machine log storage area $Z_2$ is in a full state of memory in the same manner as the step SA4 (see FIG. 6). In this case, the CPU $310_2$ determines that the result of determination is "No". Therefore, the operational sequence from step SC2 is repeated. Accordingly, local-machine logs with priorities each higher than the preset priority are successively stored on the local-machine log storage area $Z_2$.

When the local-machine log storage area $Z_2$ has entered a full state of memory due to frequent occurrences of errors in the local machine $300_2$, namely, when there is no more space for a new local-machine log on the area $Z_2$, the CPU $310_2$ determines that the result of determination at step SC6 is "Yes".

At step SC7, the CPU $310_2$ accesses the storage area B of the memory 120 via the I/F $340_2$, the communication adapter $400_2$, the network N, the communication adapter 200, and the I/F 140 in the same manner as the step SA5 (see FIG. 6). The CPU $310_2$ then sets the memory-full flag $B_2$ to "1".

Accordingly, at step SC8, the CPU 110 of the remote machine 100 recognizes that the local-machine log storage area $Z_2$ of the local machine $300_2$ is in the full state of memory. The CPU 110 then accesses the local-machine log storage area $Z_2$ of the memory $320_2$ via the I/F 140, the communication adapter 200, the network N, the communication adapter $400_2$, and the I/F $340_2$.

At step SC9, the CPU 110 collects the local-machine logs stored on the local-machine log storage area $Z_2$ of the memory $320_2$ as a local-machine log $LOG_{LM2}$. The collected local-machine log $LOG_{LM2}$ has a priority higher than the priority corresponding to the local-machine log priority threshold data $P_{C2}$.

At step SC10, the CPU 110 stores the local-machine log $LOG_{LM2}$ on the local-machine log storage area F of the memory 120. At step SC11, the CPU 110 sets the memory-full flag $B_2$ corresponding to the local machine $300_2$, from which the local-machine log $LOG_{LM2}$ has been collected, from "1" to "0". The operation is repeated at step SC2 and from then on.

As explained above, according to the third example of operation of the embodiment, only the high-priority local-machine logs are stored on the memory $320_1$ to $320_n$. Therefore, it is possible to enhance the utilization efficiency of the memory $320_1$ to $320_n$ each of which has an upper limit to its storage capacity.

Fourth Example of Operation

A fourth example of operation of the embodiment is explained below with reference to the flow chart shown in FIG. 9. In this example, the remote machine 100 collects a local-machine log corresponding to a critical error from a local machine, of the local machines $300_1$ to $300_n$, where the critical error (hardware error) has occurred.

Figure 9:
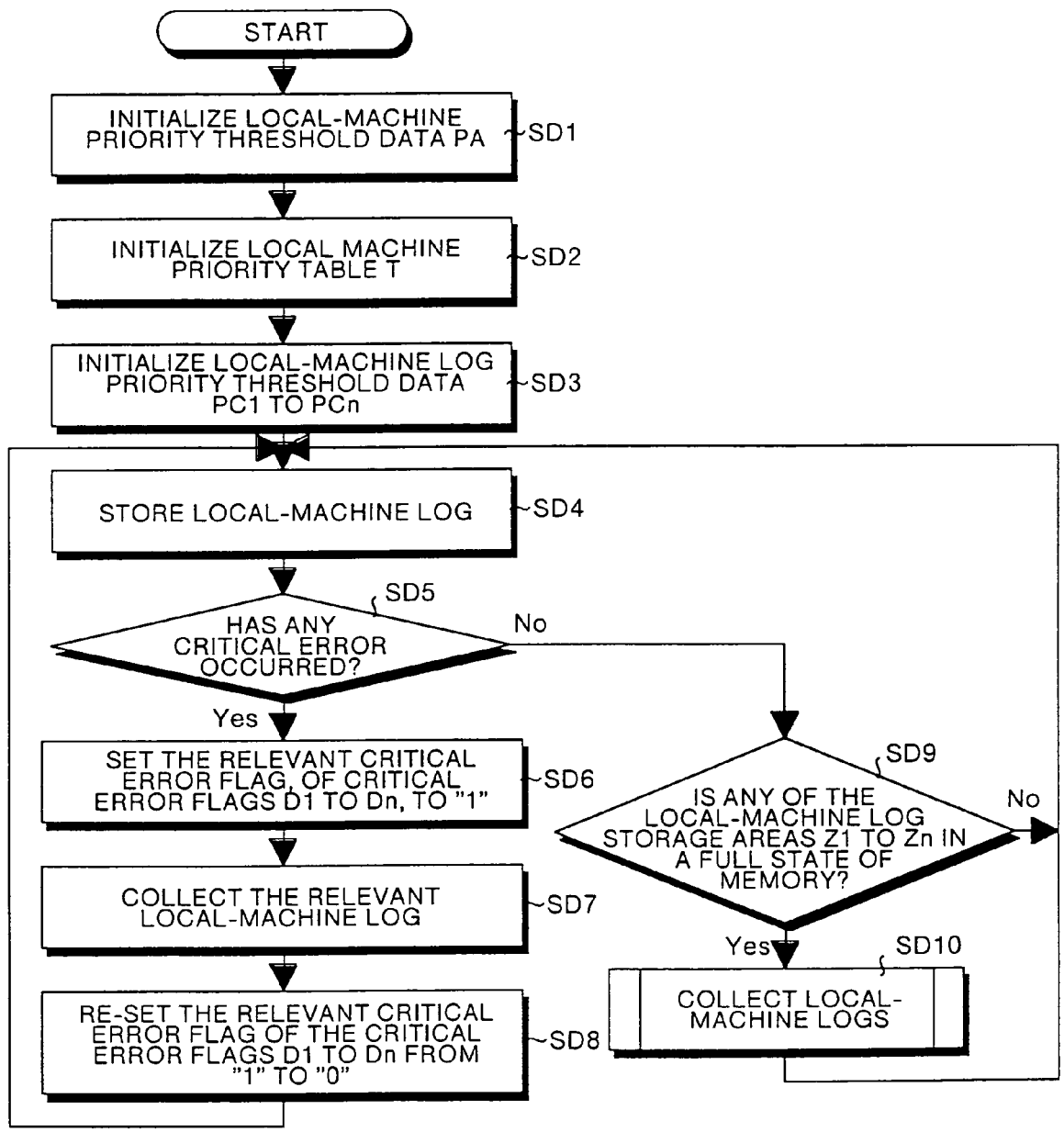
FIG. 9 is a flow chart showing a fourth example of operation of the embodiment.

At step SD1 as shown in FIG. 9, the CPU 110 of the remote machine 100 initializes local-machine priority threshold data $P_A$ (="2") in the same manner as the step SA1 (see FIG. 6). Further, the CPU 110 checks critical error flags $D_1$ to $D_n$ at predetermined time intervals based on the result of recording the time obtained from the timer 130.

At step SD2, the CPU 110 initializes the local machine priority table T in the same manner as the step SA2 (see FIG. 6). At step SD3, the CPU 110 initializes local-machine log priority threshold data $P_{C1}$ to $P_{Cn}$ in the same manner as the step SB1 (see FIG. 7).

At step SD4, each of the CPUs $310_1$ to $310_n$ of the local machines $300_1$ to $300_n$ stores a local-machine log, each time an error occurs, on the respective local-machine log storage areas $Z_1$ to $Z_n$ in correlation with the local-machine log priority data $P_{LL}$ in the same manner as the step SA3 (see FIG. 6), and proceeds to step SD5.

In this case, it is assumed that the local-machine log $LOG_{LM1-1}$ is stored on the first record of the local-machine log storage area $Z_1$ as shown in FIG. 3 because the hardware error (critical error) has occurred in the local machine $300_1$.

At step SD5, each of the CPUs $310_1$ to $310_n$ determines whether the critical error (hardware error) has occurred at step SD4. In this case, since the hardware error as a critical error has occurred in the local machine $300_1$, the CPU $310_1$ determines that the result of determination at step SD5 is "Yes".

At step SD6, the CPU $310_1$ accesses the storage area D of the memory 120 via the I/F $340_1$, the communication adapter $400_1$, the network N, the communication adapter 200, and the I/F 140. The CPU $310_1$ then sets the critical error flag $D_1$ that corresponds to the local machine $300_1$, of the critical error flags $D_1$ to $D_n$ of the storage area D, to "1".

Accordingly, at step SD7, the CPU 110 of the remote machine 100 collects the local-machine log $LOG_{LM1\_1}$ (critical error) stored on the first record of the local-machine log storage area $Z_1$ of the local machine $300_1$ via the I/F 140, the communication adapter 200, the network N, the communication adapter $400_1$, and the I/F $340_1$.

The CPU $310_2$ then stores the local-machine log $LOG_{LM1\_1}$ (critical error) on the local-machine log storage area F of the memory 120. At step SD8, the CPU 110 sets the critical error flag $D_1$ corresponding to the local machine $300_1$, from which the local-machine log $LOG_{LM1\_1}$ has been collected, from "1" to "0". The operation at step SD4 and from then on is repeated.

When any error other than the hardware error (critical error) has occurred in the local machine $300_2$, the CPU $310_2$ determines that the result of determination at step SD5 is "No". At step SD9, the CPU $310_2$ determines whether the local-machine log storage area $Z_2$ is in a full state of memory in the same manner as the step SA4 (see FIG. 6).

Assuming, in this case, that the local-machine log storage area $Z_2$ is in a full state of memory due to frequent occurrences of errors in the local machine $300_2$, the CPU $310_2$ determines that the result of determination at step SD9 is "Yes". If the result of determination at step SD9 is "No", the CPU $310_2$ returns to step SD4 and repeats the operation.

In this case, at step SD10, the CPU 110 of the remote machine 100 executes the processing for collecting local-machine logs from the local machine $300_2$, and repeats the operation at step SD4 and from then on. In the processing for collecting local-machine logs, any of the processing at step SA5 to step SA10 (First example of operation: see FIG. 6), at step SB4 to step SB11 (Second example of operation: see FIG. 7), or at step SC7 to step SC11 (Third example of operation: see FIG. 8) is executed.

As explained above, according to the fourth example of operation of the embodiment, upon occurrence of a critical error in a local machine, local-machine logs are collected from the relevant local machine. Therefore, any critical error that has occurred can speedily be handled.

Fifth Example of Operation:

In the second example of operation, the case, where the local-machine log priority data $P_{LL}$ concerning local-machine logs each generated in the local machines $300_1$ to $300_n$ is decided as shown in FIG. 3, is explained. For example, the data $P_{LL}$ is decided by referring to the local-machine log priority table TA common to the local machines $300_1$ to $300_n$. Therefore, in the second example of operation, as shown in FIG. 3, the local-machine log priority data $P_{LL}$ for local-machine logs concerning the same type of log factor (e.g., hardware error) is the same value (in this case "1") between the local-machine log storage areas $Z_1$ to $Z_n$.

Each of the local machines $300_1$ to $300_n$ may have a table where data for local-machine log priorities is defined on an individual basis, and priority data for a generated local-machine log may individually be decided based on this table. This case will be explained below as the fifth example of operation.

In this example, individual local-machine log priority tables $TB_1$ to $TB_n$ (see FIG. 4), that are stored on the memories $320_1$ to $320_n$ of the local machines $300_1$ to $300_n$ shown in FIG. 1, are used instead of the local-machine log priority table TA used in the second example of operation. Further, individual local-machine log priority threshold data $P_{E1}$ to $P_{En}$ are used instead of the local-machine log priority threshold data $P_{C1}$ to $P_{Cn}$ used in the second example of operation.

Each of the individual local-machine log priority tables $TB_1$ to $TB_n$, shown in FIG. 4 defines respective priorities (degrees of importance) of five types of local-machine logs (a hardware error log to an insignificant error log) with five levels from "1" to "5" in the same manner as the local-machine log priority table TA. However, individual local-machine log priority data $PS_{LL}$ is defined on an individual basis in each of the individual local-machine log priority tables $TB_1$ to $TB_n$.

That is, even if the same type of local-machine logs (log factors) exist between the individual local-machine log priority tables $TB_1$ to $TB_n$, the individual local-machine log priority data $PS_{LL}$ corresponding to each of the logs is different. Referring to the hardware error logs (hardware errors) in shaded areas in FIG. 4, for example, the individual local-machine log priority data $PS_{LL}$ for the hardware error log is "1" in the individual local-machine log priority tables $TB_1$. Whereas, in the individual local-machine log priority tables $TB_2$, the individual local-machine log priority data $PS_{LL}$ for the hardware error log (hardware error) is "3". Further, in the individual local-machine log priority tables $TB_n$, the individual local-machine log priority data $PS_{LL}$ for the hardware error log (hardware error) is "2".

Each of the individual local-machine log priority threshold data $P_{E1}$ to $P_{En}$ stored on the storage area E shown in FIG. 1 corresponds to each of the local machines $300_1$ to $300_n$, and one of the values of the local-machine log priorities "1" to "5" (decimal) is taken.

The individual local-machine log priority threshold data $P_{E1}$ is a threshold value used for collecting local-machine logs from the local machine $300_1$. In this case, local-machine logs each with a local-machine log priority higher than the priority corresponding to the individual local-machine log priority threshold data $P_{E1}$ are collected from the local machine $300_1$.

The individual local-machine log priority threshold data $P_{E2}$ is a threshold value used for collecting local-machine logs from the local machine $300_2$ In this case, local-machine logs each with a local-machine log priority higher than the priority corresponding to the individual local-machine log priority threshold data $P_{E2}$ are collected from the local machine $300_2$.

Similarly, the individual local-machine log priority threshold data $P_{En}$ is a threshold value used for collecting local-machine logs from the local machine $300_n$. In this case, local-machine logs each with a local-machine log priority higher than the priority corresponding to the individual local-machine log priority threshold data $P_{En}$ are collected from the local machine $300_n$.

Figure 10:
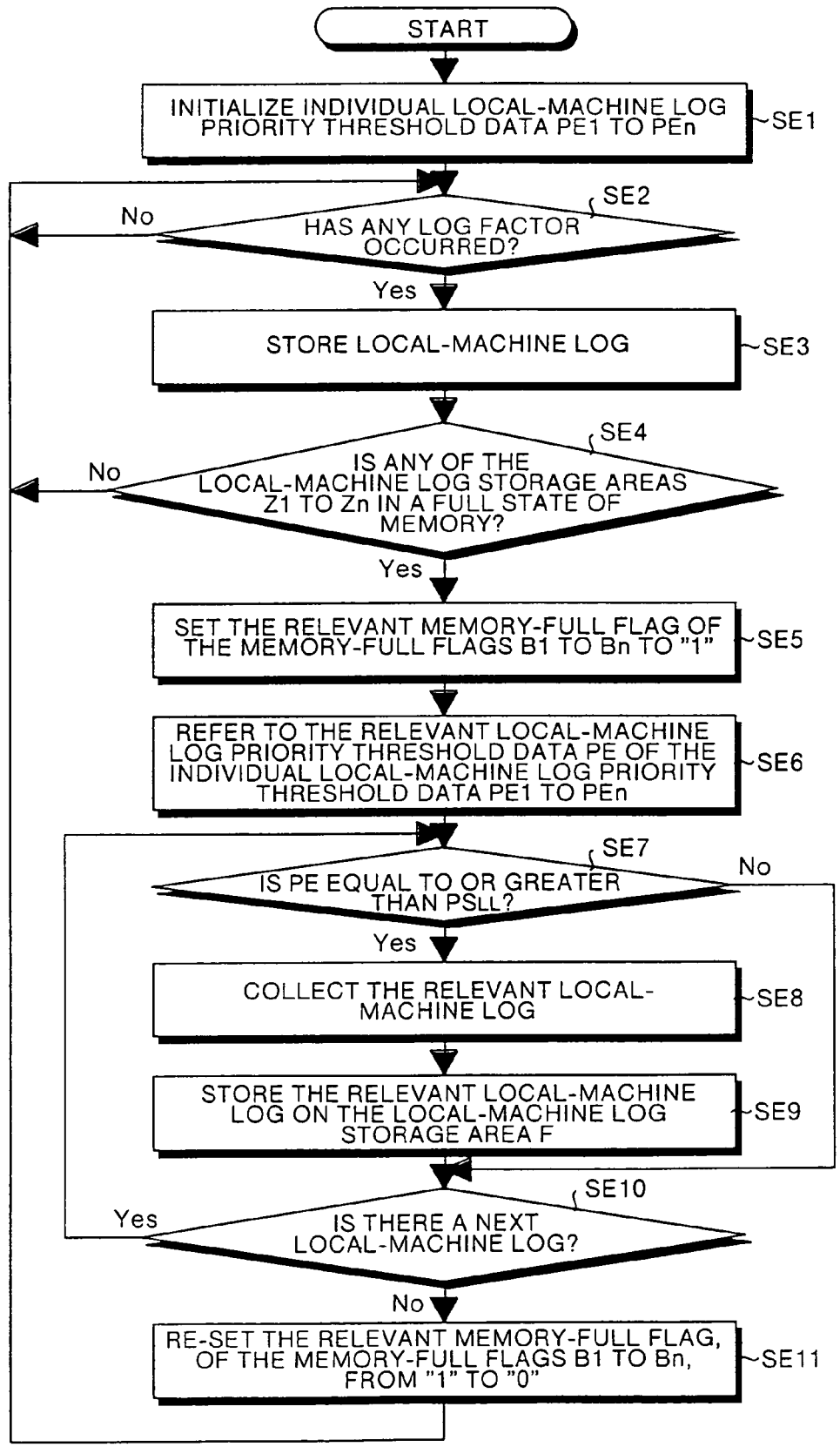
FIG. 10 is a flow chart showing the fifth example of operation of the embodiment.

At step SE1 as shown in FIG. 10, the CPU 110 of the remote machine 100 initializes each of the individual local-machine log priority threshold data $P_{E1}$ to $P_{En}$. In this case, the CPU 110 initializes "2" (decimal) out of "1" to "5" as the individual local-machine log priority threshold data $P_{E1}$. Accordingly, "001" (binary) corresponding to the "2" (decimal) are set in bits $E_{11}$ to $E_{13}$ on the storage area E of the memory 120.

Similarly, the CPU 110 initializes "3" (decimal) out of "1" to "5" as the individual local-machine log priority threshold data $P_{E2}$ Accordingly, "010" (binary) corresponding to the "3" (decimal) are set in bits $E_{21}$ to $E_{23}$ on the storage area E of the memory 120.

The CPU 110 then initializes "3" (decimal) out of "1" to "5" as the individual local-machine log priority threshold data $P_{En}$ in the same manner as explained above. Accordingly, "010" (binary) corresponding to the "3" (decimal) are set in bits $E_{n1}$ to $E_{n3}$ on the storage area E of the memory 120. Further, the CPU 110 checks the memory-full flags $B_1$ to $B_n$ at predetermined time intervals based on the result of recording the time obtained from the timer 130.

At step SE2, each of the CPUs $310_1$ to $310_n$ of the local machines $300_1$ to $300_n$ determines whether a log factor (e.g., a hardware error, a firmware error/software error) has occurred, and repeats the processing of determination when the result of determination is "No". For example, when a hardware error has occurred as a log factor in the local machine $300_n$, the CPU $310_n$ determines that the result of determination is "Yes".

At step SE3, the CPU $310_n$ of the local machine $300_n$ stores the local-machine log $LOG_{LMn\_3}$ of the local-machine log storage area $Z_n$ shown in FIG. 5 on the local-machine log storage area $Z_n$. In the storage area, this local-machine log $LOG_{LMn\_3}$ is correlated with the individual local-machine log priority data $PS_{LL}$ (="2") of the individual local-machine log priority table $TB_n$ shown in FIG. 4.

At step SE4, the CPU $310_n$ determines, in the same manner as the step SA4 (see FIG. 6), whether the local-machine log storage area $Z_n$ of the memory $320_n$ is in a full state of memory. In this state, the CPU $310_n$ determines that the result of determination is "No". Therefore, the operational sequence from step SE2 is repeated. Thus, the local-machine logs are stored on the local-machine log storage area $Z_n$ in order of their generation as shown in FIG. 5.

When the local-machine log storage area $Z_n$ has entered a full state of memory due to frequent occurrences of errors in the local machine $300_n$, namely such a state that there is no more space for a new local-machine log on the area $Z_n$, the CPU $310_n$ determines that the result of determination at step SE4 is "Yes".

At step SE5, the CPU $310_n$ accesses the storage area B of the memory 120 via the I/F $340_n$, the communication adapter $400_n$, the network N, the communication adapter 200, and the I/F 140 in the same manner as the step SA5 (see FIG. 6), and then sets the memory-full flag $B_n$ to "1".

Accordingly, at step SE6, the CPU 110 of the remote machine 100 recognizes that the local-machine log storage area $Z_n$ of the local machine $300_n$ is in the full state of memory. The CPU 110 refers to the individual local-machine log priority threshold data $P_E$ (in this case, $P_{En}$="3") corresponding to the local machine $300_n$, of the individual local-machine log priority threshold data $P_{E1}$ to $P_{En}$.

At step SE7, the CPU 110 accesses the local-machine log storage area $Z_n$ of the memory $320_n$ via the I/F 140, the communication adapter 200, the network N, the communication adapter $400_n$, and the I/F $340_n$. The CPU 110 then determines whether the individual local-machine log priority data $PS_{LL}$ (="2") in the third record of the local-machine log storage area $Z_n$ shown in FIG. 5 is lower than the individual local-machine log priority threshold data $P_E$ (in this case, $P_{En}$ (="3")).

In other words, the CPU 110 determines whether the priority of the local-machine logs $LOG_{LMn\_3}$ is higher than the priority set at step SE1. In this case, the CPU 110 determines that the result of determination at step SE7 is "Yes". If the result of determination at step SE7 is "No", the CPU 110 proceeds to step SE10.

In this case, at step SE8, the CPU 110 collects the local-machine log $LOG_{LMn\_3}$ in the third record of the local-machine log storage area $Z_n$ via the I/F $340_n$, the communication adapter $400_n$, the network N, the communication adapter 200, and the I/F 140.

At step SE9, the CPU 110 stores the local-machine log $LOG_{LMn\_3}$ on the local-machine log storage area F of the memory 120. At step SE10, the CPU 110 determines whether there is a next local-machine log in the local-machine log storage area $Z_n$. In this case, the CPU 110 determines that the result of determination is "Yes", and returns to step SE7.

The operation is repeated from then on. Of the plurality of local-machine logs stored on the local-machine log storage area $Z_n$, the local-machine logs each with a local-machine log priority higher than the priority initialized at step SE1 are collected by the CPU 110 of the remote machine 100.

When the processing for the last record of the local-machine log storage area $Z_n$ is finished, the CPU 110 determines that the result of determination at step SE10 is "No". At step SE11, the CPU 110 sets the memory-full flag $B_n$ corresponding to the local machine $300_n$ from "1" to "0". The operation is repeated at step SE2 and from then on.

As explained above, according to the fifth example of operation of the embodiment, respective priorities of local-machine logs corresponding to a plurality of local machines are set individually. Therefor, even if the same type of local-machine logs exist, each of their priorities can be made different between the plurality of local machines. Thus, local-machine logs can flexibly be collected according to the state of the respective local machines.

Sixth Example of Operation

A sixth example of operation of the embodiment is explained below with reference to the flow chart shown in FIG. 11. In this example, when any critical error (e.g., a hardware error) has occurred in the remote machine 100, the collection of local-machine logs, that is supposed to be performed by the remote machine 100, is executed by an arbitrary machine of the local machines $300_1$ to $300_n$ for the remote machine 100.

Figure 11:
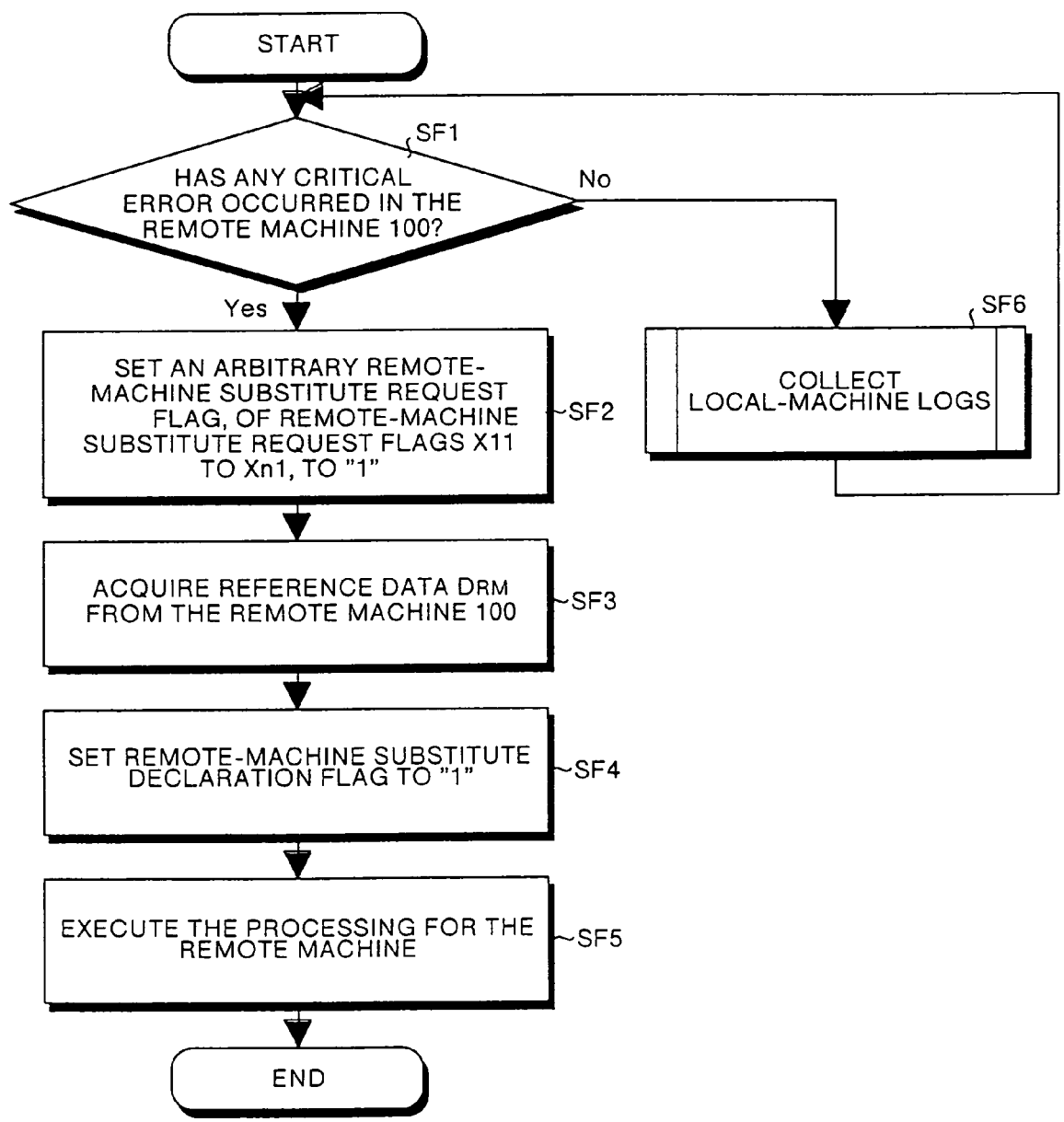
FIG. 11 is a flow chart showing a sixth example of operation of the embodiment.

At step SF1 as shown in FIG. 11, the CPU 110 of the remote machine 100 determines whether a critical error has occurred in the remote machine 100, and proceeds to step SF6 when the result of determination is "No". At step SF6, the CPU 110 executes any type of operation, of the first to fifth examples of operation, for collecting local-machine logs, returns to step SF1, and repeats the operation. The CPUs $310_1$ to $310_n$ of the local machines $300_1$ to $300_n$ check remote-machine substitute request flags $X_{11}$ to $X_{n1}$ at predetermined time intervals based on the results of recording the times by timers $330_1$ to $330_n$, respectively.

When a hardware error as a critical error has occurred in the remote machine 100, the remote machine 100 determines that the result of determination at step SF1 is "Yes". At step SF2, the CPU 110 sets an arbitrary remote-machine substitute request flag, of the remote-machine substitute request flags $X_{11}$ to $X_{n1}$, to "1". Precisely, the CPU 110 requests an arbitrary local machine, of the local machines $300_1$ to $300_n$, to act as a substitute to execute the collection of local-machine logs. It is assumed, in this case, that the local machine $300_2$ has been requested to be a substitute to execute the collection of local-machine logs.

Therefore, the CPU 110 accesses the memory $320_2$ via the I/F 140, the communication adapter 200, the network N, the communication adapter $400_2$, and the I/F $340_2$, and sets the remote-machine substitute request flag $X_{21}$ to "1". Accordingly, the CPU $310_2$ of the local machine $300_2$ recognizes that the CPU $310_2$ itself has been requested from the remote machine 100 to act as a substitute to execute the collection of local-machine logs. The CPU $310_2$ then accesses the memory 120 via the I/F $340_2$, the communication adapter $400_2$, the network N, the communication adapter 200, and the I/F 140 to acquire reference data $D_{RM}$.

The reference data $D_{RM}$ we mention here is information required for the collection of local-machine logs. This reference data $D_{RM}$ includes the local machine priority table T, the local-machine priority threshold data $P_A$, the memory-full flags $B_1$ to $B_n$, the local-machine log priority threshold data $P_{C1}$ to $P_{Cn}$, the critical error flags $D_1$ to $D_n$, and the individual local-machine log priority threshold data $P_{E1}$ to $P_{En}$. The reference data $D_{RM}$ also includes the local-machine logs stored on the local-machine log storage area F and the remote logs stored on the remote log storage area G.

The CPU $310_2$ stores the acquired reference data $D_{RM}$ on the memory $320_2$. At step SF4, the CPU $310_2$ sets the remote-machine substitute declaration flags $Y_{12}$ to $Y_{n2}$ (excluding $Y_{22}$) of local machines except the local machine $300_2$ to "1". Accordingly, the respective CPUs of the local machines except the local machine $300_2$ recognize that the local machine $300_2$ acts as a substitute to execute the collection of local-machine logs for the remote machine 100.

At step SF5, the CPU $310_2$ of the local machine $300_2$ acts as a substitute to perform the processing for the remote machine. In other words, the CPU $310_2$ executes the operation (one of the first to fifth examples of operation) of collecting local-machine logs using the reference data $D_{RM}$ in the same manner as the CPU 110 of the remote machine 100. In this case, the CPUs of the local machines except the local machine $300_2$ operate by setting the local machine $300_2$ as a destination of their access instead of the remote machine 100.

As explained above, according to the sixth example of operation of the embodiment, even if a critical error has occurred, an arbitrary local machine acts as a substitute to execute the collection of local-machine logs. Therefore, the collection of local-machine logs can continuously be performed, which allows reliability to be enhanced.

Seventh Example of Operation

A seventh example of operation of the embodiment is explained below with reference to the flow chart shown in FIG. 12. In this example, when any critical error (e.g., hardware error) has occurred in the remote machine 100, the collection of local-machine logs that is supposed to be operated by the remote machine 100 is executed by some other machine, of the local machines $300_1$ to $300_n$, that has the lowest local machine priority.

Figure 12:
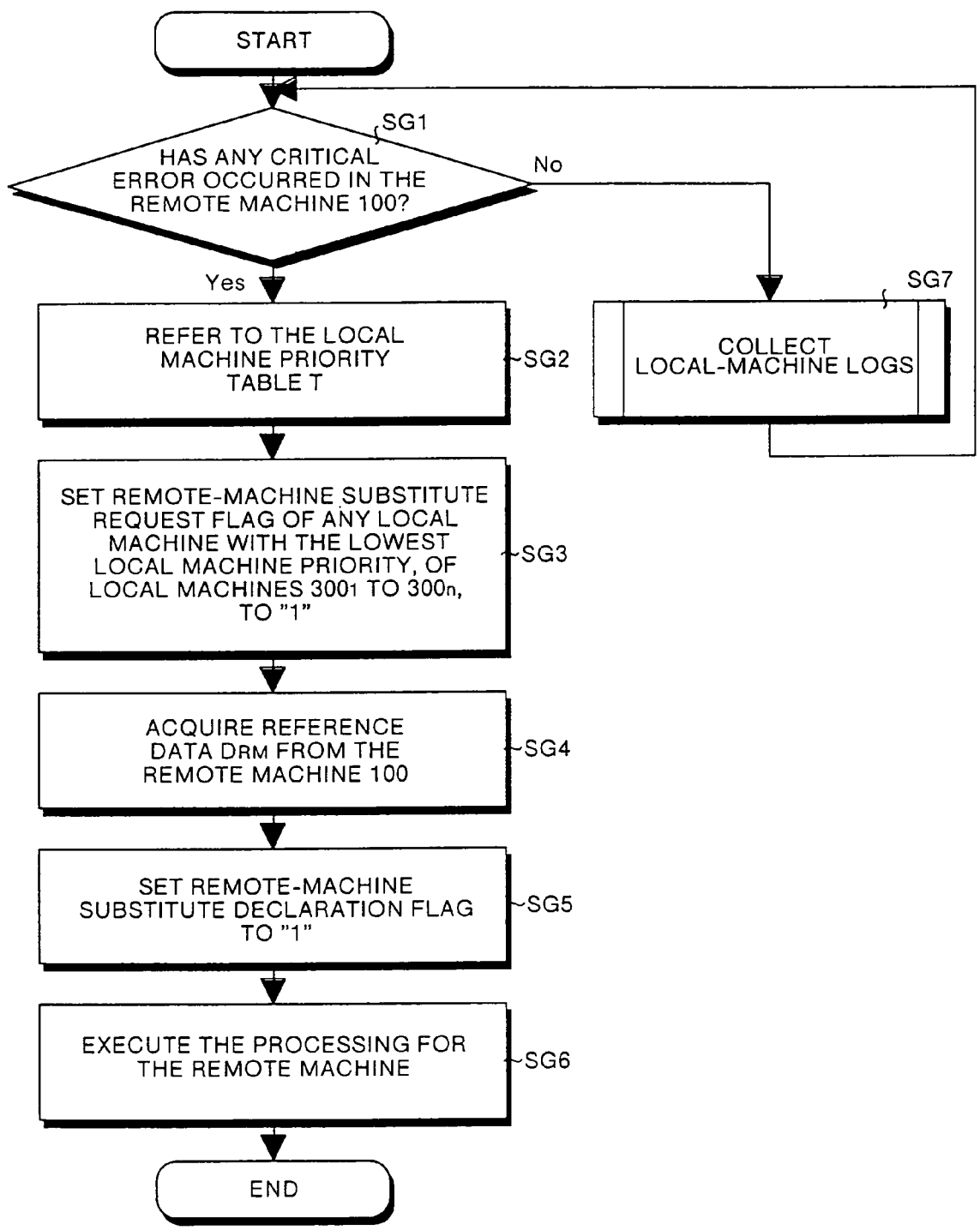
FIG. 12 is a flow chart showing a seventh example of operation of the embodiment.

At step SG1 as shown in FIG. 12, the CPU 110 of the remote machine 100 determines whether a critical error has occurred in the remote machine 100, and proceeds to step SG7 when the result of determination is "No". At step SG7, the CPU 110 executes any operation, of the first to fifth examples of operation, of collecting local-machine logs, returns to step SG1, and repeats the operation. The CPUs $310_1$ to $310_n$ of the local machines $300_1$ to $300_n$ check remote-machine substitute request flags $X_{11}$ to $X_{n1}$ at predetermined time intervals based on the results of recording the times by timers $330_1$ to $330_n$, respectively.

When a hardware error as a critical error has occurred in the remote machine 100, the remote machine 100 determines that the result of determination at step SG1 is "Yes". At step SG2, the CPU 110 accesses the memory 120 to refer to the local machine priority table T and recognizes a local machine with the lowest local machine priority of the local machines $300_1$ to $300_n$. It is assumed, in this case, that the CPU 110 recognizes the local machine $300_n$ as one with the lowest local machine priority.

At step SG3, the remote-machine substitute request flag $X_{n1}$ of the local machine $300_n$ is set to "1". In other words, the CPU 110 requests the local machine $300_n$ with the lowest local machine priority, of the local machines $300_1$ to $300_n$, to act as a substitute to execute the collection of local-machine logs.

Therefore, the CPU 110 accesses the memory $320_2$ via the I/F 140, the communication adapter 200, the network N, the communication adapter $400_n$, and the I/F $340_n$, and sets the remote-machine substitute request flag $X_{n1}$ to "1". Accordingly, the CPU $310_n$ of the local machine $300_n$ recognizes that the CPU $310_n$ itself has been requested from the remote machine 100 to act as a substitute to execute the collection of local-machine logs. At step SG4, the CPU $310_n$ then accesses the memory 120 via the I/F $340_n$, the communication adapter $400_n$, the network N, the communication adapter 200, and the I/F 140 to acquire reference data $D_{RM}$.

The reference data $D_{RM}$ mentioned here is the information required for the collection of local-machine logs. This reference data $D_{RM}$ includes the local machine priority table T, the local-machine priority threshold data $P_A$, the memory-full flags $B_1$ to $B_n$, the local-machine log priority threshold data $P_{C1}$ to $P_{Cn}$, the critical error flags $D_1$ to $D_n$, and the individual local-machine log priority threshold data $P_{E1}$ to $P_{En}$. The reference data $D_{RM}$ also includes the local-machine logs stored on the local-machine log storage area F and the remote logs stored on the remote log storage area G.

The CPU $310_2$ stores the acquired reference data $D_{RM}$ on the memory $320_2$. At step SG5, the CPU $310_n$ sets the remote-machine substitute declaration flags $Y_{1n}$ to $Y_{nn-1}$ of local machines except the local machine $300_n$ to "1". Accordingly, the respective CPUs of the local machines except the local machine $300_n$ recognize that the local machine $300_n$ acts as a substitute to execute the collection of local-machine logs.

At step SG6, the CPU $310_n$ of the local machine $300_n$ acts as a remote-machine substitute to perform the processing. In other words, the CPU $310_n$ executes the operation (one of the first to fifth examples of operation) of collecting local-machine logs using the reference data $D_{RM}$ in the same manner as the CPU 110 of the remote machine 100. In this case, the CPUs of the local machines except the local machine $300_n$ operate by setting the local machine $300_n$ as a destination of their access instead of the remote machine 100.

As explained above, according to the seventh example of operation of the embodiment, when a critical error has occurred, any local machine with the lowest priority is allowed to act as a substitute to execute the collection of local-machine logs. Therefore, the collection of local-machine logs can continuously be performed. Thus, it is possible to avoid degradation in performance of the other local machines with high priorities.

Although the invention has been explained in detail with respect to the embodiment with reference to the drawings, it is to be understood that concrete examples of the configuration are not limited by the embodiment and modifications and alterations without departing from the spirit of the invention may also be embraced by the invention.

For example, collection or generation of local-machine logs may be performed by the steps as follows. That is, the steps of recording the information collecting program or the information generating program to realize the functions of the remote machine 100 or the functions of the local machines $300_1$ to $300_n$ on the computer-readable recording medium 600 shown in FIG. 13, and reading the information collecting program or the information generating program recorded on this recording medium 600 into the computer 500 shown in FIG. 13 for its execution.

Figure 13:
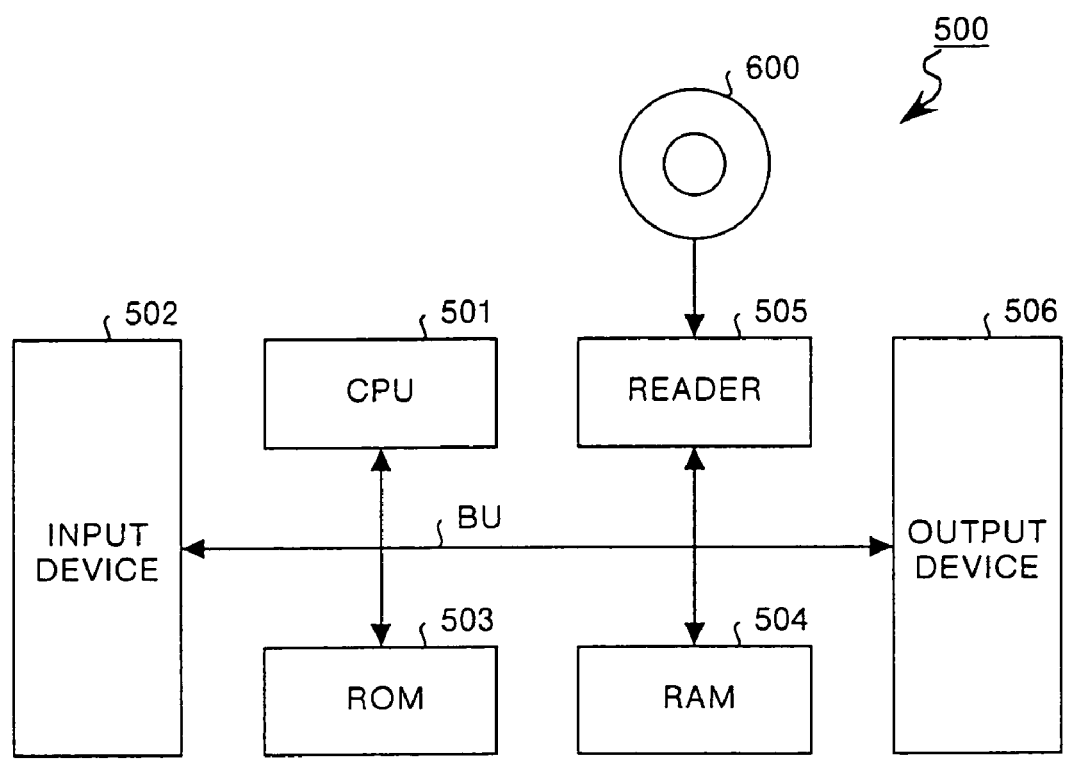
FIG. 13 is a block diagram showing a variant of the embodiment.

The computer 500 shown in FIG. 13 comprises a CPU 501 that executes the information collecting program or the information generating program, an input device 502 such as a mouse, ROM (Read Only Memory) 503 that stores various data, and RAM (Random Access Memory) 504 that stores operation parameters or the like. The computer 500 further comprises a reader 505 that reads the information collecting program or the information generating program from the recording medium 600, an output device 506 such as a display and a printer, and a bus BU that connects between the devices.

The CPU 501 collects or generates the remote machine logs by reading the information collecting program or the information generating program recorded on the recording medium 600 via the reader 505 and executing the read-in information collecting program or the information generating program. The recording medium 600 includes not only a portable recording medium such as an optical disk, a floppy disk, or a hard disk, but also any transport media such as a network that temporarily records and holds data.

As explained above, according to one aspect of this invention, respective priorities to be given to a plurality of information generation apparatuses are defined, and information is collected only from the information generation apparatus whose priority is high. Therefore, pieces of information generated in the information generation apparatuses with high priorities can be collected more as compared to those in the conventional case. Further, only the information generated in the information generation apparatus with a high priority is stored on the collection-side information storage unit. Resultantly, it is possible to enhance the utilization efficiency of the collection-side information storage unit that has an upper limit to its storage capacity.

According to another aspect of this invention, only pieces of information with high priorities are collected. Therefore, of the information generated in the relevant information generation apparatus, pieces of information with high priorities can be collected more as compared to those in the conventional case. Further, only the information with a high priority is stored on the collection-side information storage unit. Resultantly, it is possible to enhance the utilization efficiency of the collection-side information storage unit that has an upper limit to its storage capacity.

Further, the priorities of respective information are individually set in correspondence with a plurality of information generation apparatuses, respectively. Therefore, even if the same type of information exists, each of the priorities can be made different between the plurality of information generation apparatuses. Resultantly, information can flexibly be collected according to the state of the respective information generation apparatuses.

According to still another aspect of this invention, upon occurrence of a certain error in an information generation apparatus, information is collected from the relevant information generation apparatus. Resultantly, any error that has occurred can speedily be handled.

Further, even when a certain error has occurred, the collection of information can be executed by an arbitrary information generation apparatus as a substitute. Resultantly, the collection of information can continuously be performed, which allows reliability to be enhanced.

Further, when a certain error has occurred, any information generation apparatus with the lowest priority is allowed to act as a substitute to execute the operation of collecting information. Therefore, the collection of information can be continued. Resultantly, it is possible to avoid degradation in respective performance of the other information generation apparatuses with high priorities.

According to still another aspect of this invention, only information with a high priority is stored. Resultantly, it is possible to enhance the utilization efficiency of the information storage unit that has an upper limit to its storage capacity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information collection apparatus, which collects information via transmission paths from a plurality of information generation apparatuses, wherein each of said information generation apparatuses has a generation-side information storage unit which stores the information generated by said information generation apparatuses due to a specific generation factor, said information collection apparatus comprising:

a table storage unit which stores a priority definition table in which respective priorities of said plurality of information generation apparatuses are defined;

an information collection unit which refers to the priority definition table upon reception of a notice from an information generation apparatus that is any of said information generation apparatuses and in which an amount of information stored on said generation-side information storage unit of said information generation apparatus has reached a predetermined amount, where if the priority of said information generation apparatus is higher than a preset priority the collection unit responds to the notice by collecting the information stored on the generation-side information storage unit of said information generation apparatus, and where if the priority of said information generation apparatus is lower than the preset priority then the collection unit disregards the notice and does not perform collection for the notice;

a collection-side information storage unit which stores the information collected by said information collection unit; and a substitution control unit which allows any one or more of said information generation apparatuses to act as a substitute to execute the operation of collecting information, that is supposed to be executed by said information collection unit, when a given error has occurred.

2. The information collection apparatus according to claim 1, wherein said substitution control unit allows an information generation apparatus out of said information generation apparatuses with the lowest priority to act as the substitute, to execute the operation of collecting information.

3. An information collection apparatus, which collects information via transmission paths from a plurality of information generation apparatuses, wherein each of said information generation apparatuses has a generation-side information storage unit which stores the information generated by said information generation apparatuses due to a specific generation factor, said information collection apparatus comprising:

an information collection unit which, upon reception of notices sent from corresponding information generation apparatuses based upon an amount of information stored on corresponding said generation-side information storage units, responds to notices from information generation apparatuses with priorities higher than a preset priority by collecting stored generated information from such information generation apparatuses, and responds to notices corresponding to information generation apparatuses with priorities lower than the preset priority by disregarding such notices by not collecting stored generated information from respective information generation apparatuses;

a collection-side information storage unit which stores the information collected by said information collection unit; and a substitution control unit which allows any one or more of said information generation apparatuses to act as a substitute to execute the operation of collecting information, that is supposed to be executed by said information collection unit when a given error has occurred.

4. The information collection apparatus according to claim 3, wherein said substitution control unit allows an information generation apparatus out of said information generation apparatuses with the lowest priority to act as the substitute, to execute the operation of collecting information.

5. An information collection apparatus, which collects information via transmission paths from a plurality of information generation apparatuses, wherein each of said information generation apparatuses has a generation-side information storage unit which stores the information generated by said information generation apparatuses due to a specific generation factor, said information collection apparatus comprising:

an information collection unit which, upon reception of a notice sent from an information generation apparatus in which a given error has occurred and from which the notice has been sent responsive thereto, collects information stored on the generation-side information storage unit of said information generation apparatus if the priority of said information generation apparatus is higher than a preset priority and disregards the notice by not collecting the information stored if the priority of said information generation apparatus lower than the preset priority, where the information generation apparatus may be any of the information storage apparatuses;

a collection-side information storage unit which stores the information collected by said information collection unit; and a substitution control unit which allows any one or more of said information generation apparatuses to act as a substitute to execute the operation of collecting information, that is supposed to be executed by said information collection unit, when a given error has occurred.

6. The information collection apparatus according to claim 5, wherein said substitution control unit allows an information generation apparatus out of said information generation apparatuses with the lowest priority to act as the substitute, to execute the operation of collecting information.

* * * * *